US009544341B2

United States Patent
Madabhushi et al.

(10) Patent No.: US 9,544,341 B2
(45) Date of Patent: Jan. 10, 2017

(54) DISTRIBUTED AUDIO CONFERENCING ARCHITECTURE WITH OPTIMUM RESOURCE UTILIZATION AND SEAMLESS SCALABILITY

(71) Applicant: ShoreTel, Inc., Sunnyvale, CA (US)

(72) Inventors: Pramod Madabhushi, Schaumburg, IL (US); Prasannakumar Mallappa, Union City, CA (US); Puneet Saran Sarna, Mountain View, CA (US)

(73) Assignee: Shoretel, Inc., Sunnyvale, CA (US)

(*) Notice: Subject to any disclaimer, the term of this patent is extended or adjusted under 35 U.S.C. 154(b) by 0 days.

(21) Appl. No.: 14/856,431

(22) Filed: Sep. 16, 2015

(65) Prior Publication Data

US 2016/0099978 A1 Apr. 7, 2016

Related U.S. Application Data

(63) Continuation of application No. 12/345,077, filed on Dec. 29, 2008, now Pat. No. 9,143,618.

(51) Int. Cl.

| | |
|---|---|
| ***H04M 3/56*** | (2006.01) |
| ***H04L 12/18*** | (2006.01) |
| ***H04L 29/06*** | (2006.01) |
| ***H04M 3/22*** | (2006.01) |

(52) U.S. Cl.

CPC ......... *H04L 65/1069* (2013.01); *H04L 65/403* (2013.01); *H04M 3/2227* (2013.01); *H04M 3/56* (2013.01); *H04M 3/562* (2013.01)

(58) Field of Classification Search

CPC .. H04N 21/4394; H04N 21/439; H04N 7/148; H04M 3/568; H04L 65/60

USPC ........................................................ 370/261

See application file for complete search history.

(56) References Cited

U.S. PATENT DOCUMENTS

| | | | | |
|---|---|---|---|---|
| 5,933,412 A * | 8/1999 | Choudhury | H04Q 11/0478 | 370/218 |
| 2003/0023672 A1* | 1/2003 | Vaysman | H04L 12/1827 | 709/203 |
| 2005/0221851 A1* | 10/2005 | Grivas | H04W 84/08 | 455/518 |
| 2007/0230374 A1* | 10/2007 | Altberg | H04M 7/006 | 370/271 |
| 2008/0063173 A1* | 3/2008 | Sarkar | H04L 12/1827 | 379/202.01 |
| 2008/0165707 A1* | 7/2008 | Baird | H04L 65/607 | 370/260 |

* cited by examiner

*Primary Examiner* — Parth Patel
*Assistant Examiner* — Jason Harley
(74) *Attorney, Agent, or Firm* — Tarolli, Sundheim, Covell & Tummino LLP

(57) ABSTRACT

A conference call solution with one or more conference server, one or more conference bridge and one or more media mixer. A conference server is chosen as the conference bridge for the conference call using various optimization techniques. A media mixer for the conference call may also be chosen using various optimization techniques. The media mixer mixes media data from one or more conference bridge. If a conference bridge or the media mixer fails, the system recovers from the failure with minimal interruption to the users.

23 Claims, 18 Drawing Sheets

Bridge controller 2120a
Memory 2130a
Inter-bridge communicator 2140a
Softswitch 2160a
Media 2180a
102a
Bridge controller 2120b
Memory 2130b
Inter-bridge communicator 2140b
Softswitch 2160b
Media 2180b
102b
106a
106b
106c
Switch A 104a
Site A
106g
106g
106i
Switch B 104b
Site B

800

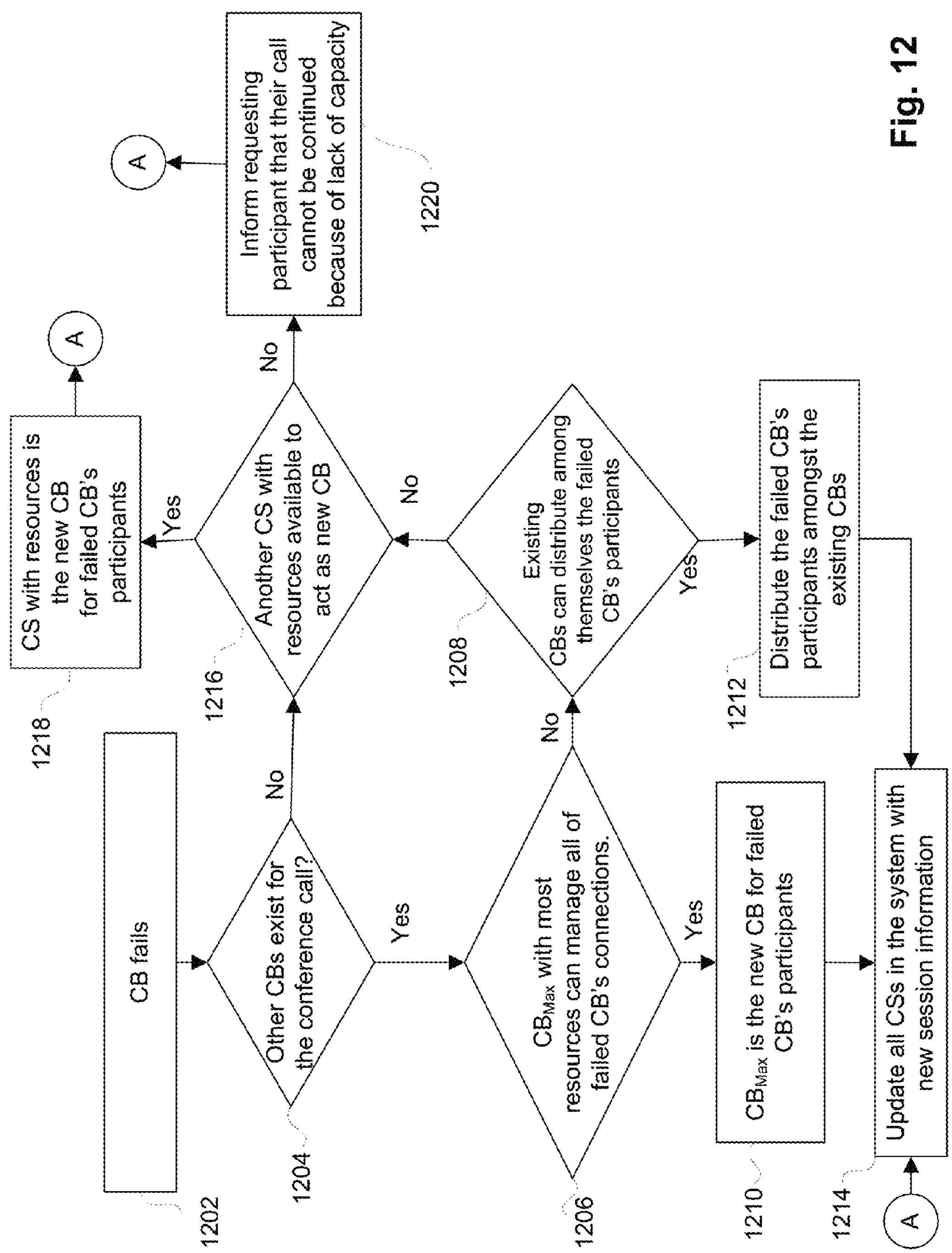
CB fails
1202
Other CBs exist for the conference call?
1204
Yes
No
CBMax with most resources can manage all of failed CB's connections.
1206
Yes
No
Existing CBs can distribute among themselves the failed CB's participants
1208
Yes
No
CBMax is the new CB for failed CB's participants
1210
Distribute the failed CB's participants amongst the existing CBs
1212
Update all CSs in the system with new session information
1214
A
Another CS with resources available to act as new CB
1216
Yes
No
CS with resources is the new CB for failed CB's participants
1218
A
Inform requesting participant that their call cannot be continued because of lack of capacity
1220
A
Fig. 12

DISTRIBUTED AUDIO CONFERENCING ARCHITECTURE WITH OPTIMUM RESOURCE UTILIZATION AND SEAMLESS SCALABILITY

CROSS REFERENCE TO RELATED APPLICATIONS

This application is a divisional of and claims priority to U.S. application Ser. No. 12/345,077, filed Dec. 29, 2008, titled "Distributed Audio Conferencing Architecture with Optimum Resource Utilization and Seamless Scalability," which issued as U.S. Pat. No. 9,143,618 B2 on Sep. 22, 2015, and which is incorporated by reference in its entirety.

BACKGROUND OF THE INVENTION

1. Field of the Invention

This invention relates to systems and methods for optimizing resource allocation in a conference call solution. In particular, the present invention relates to a distributed architecture for conference calls in a Voice over Internet Protocol (VOIP) system.

2. Description of the Background Art

A group of people decide to participate in a conference call. Any user with privileges sets up a conference call for a particular time, and provides a conference call number and password for the conference session. People call in and the conference is set up. Such a situation has been handled by various conference solutions but the magic lies in how different solutions handle the behind-the-scenes set up.

Traditionally, a conference call solution has one call server to handle conference call sessions. If the server reaches its capacity, additional callers cannot be accommodated. Moreover, if the stand-alone server fails, the conference call is terminated.

The alternative to stand alone server is a cluster of servers driven by a master server. The master server gets all conference call requests and the master then allocates various conference calls to different slave servers in the cluster. In this master-slave system, the master server becomes the bottleneck. Because all call requests are made to the master server, the master server must have the processing resources to handle all the call requests. If the master server crashes, the whole system becomes inoperative. Additionally, the network connection between the master server and the caller's site may become a bandwidth bottleneck. Also, scaling a master-server conference call system requires tedious manual configurations. Moreover, the master-slave architecture does not use the available bandwidth efficiently when connection requests for one conference call are allocated to more than one conference call servers.

The traditional conference call solutions also limit the number of participants that can be heard in a conference call. The traditional conference call solutions cannot handle numerous parties speaking in temporal proximity in a conference call. The conference call solutions therefore choose a limited number, typically three, of the loudest parties in the conference call and mute the rest of the participants in the call. The traditional solutions allow only these loudest parties to be heard in the conference call even if a conference call solution is serving hundreds of participants.

SUMMARY OF THE INVENTION

The present invention addresses the drawbacks of traditional conference call solutions. The present invention comprises a distributed conferencing system having one or more distributed conference servers that communicate with each other during a conference call set up.

A conference server comprises a bridge controller, a memory, an inter-bridge communicator, a softswitch and a media module. These modules in a conference server can be software, hardware or a blend of software and hardware. The media module encodes and decodes media data coming in and going out of the conference server. The softswitch sets up call connections between endpoints and a conference server as well as between two conference servers. The inter-bridge communicator provides data connectivity between various conference servers, the memory stores data for other modules in the conference server and the bridge controller directs the modules in the conference server.

The above mentioned modules in the conference server advantageously enable the conference server to be an assigned conference server for a telephone that routes the incoming and outgoing calls for the telephone, a conference bridge that manages a telephone's connection to a conference call, or a media mixer that mixes media data from conference call participants.

In one embodiment, a plurality of conference servers in the system maintain information about other conference servers' availability and existing connections. Because a plurality of conference servers in the system maintain information about other conference servers in the system, there is no bottleneck server like the master in master-slave configuration of the prior art. If one of the conference bridges fails, another conference server may become the conference bridge for the connections of failed conference bridge.

Additionally, one embodiment of the present invention makes efficient use of available bandwidth by intelligently assigning an assigned conference server to a site such that the assigned conference server has the most amount of bandwidth available for a particular site. The more available bandwidth leads to a conference server's extended capability to handle more connections from a site when the conference server becomes a conference bridge.

One embodiment of the present invention also concentrates assigned conference servers and conference bridges utilized for a conference call such that resources are not fragmented all over the system. For example, if there are a few connections on conference bridge A and a few connections on conference bridge B, the assigned conference servers and the conference bridges negotiate a single conference server that acts as a conference bridge for connections to a conference call. This optimization can be done during or after the call setup.

In one embodiment, the conference bridges are configured to mix media data from n number of loudest participants amongst all their participants. The conference bridges exchange this mixed participant media data with each other. After a conference bridge receives mixed participant media data from other conference bridges, the conference bridge mixes the received mixed participant media data with its own participant's media. Even though each mixed participant media data stream comprises n number of loudest parties, the conference bridge treats each mixed participant media data stream as one loudest party. The conference bridge therefore can mix n number of mixed participant media streams (each with n number of loudest participants) into a conference media stream and achieves a conference media stream with media data from $n^2$ loudest participants in the conference call.

One embodiment of the present invention uses the bandwidth and the processing power efficiently by selecting a media mixer for a conference call. Instead of mixing media at multiple conference bridges, the conference bridges select one or more conference servers as the media mixer for the conference call. The media mixer receives media from conference bridges, mixes the media for conference bridges, and transmits the mixed media to the conference bridges. The conference bridges then transmit the mixed media to their respective participants. In this manner, one embodiment of the present invention makes efficient use of processing power by mixing media at the media mixer and avoiding mixing media at multiple conference bridges. One embodiment of the present invention also efficiently uses bandwidth between various conference bridges because conference bridges now exchange media data with the media mixer instead of all other conference bridges for the conference call.

In one embodiment, a plurality of conference servers in the system are capable of mixing media or managing participant connections for a conference call. If a media mixer or a conference bridge fails, another conference server with available resources assumes the role of the failed media mixer or conference bridge.

BRIEF DESCRIPTION OF THE DRAWINGS

The invention is illustrated by way of example, and not by way of limitation in the figures of the accompanying drawings.

FIG. 12 is a flow chart depicting in detail one embodiment of a method for performing failover according to the present invention.

Figure 1:
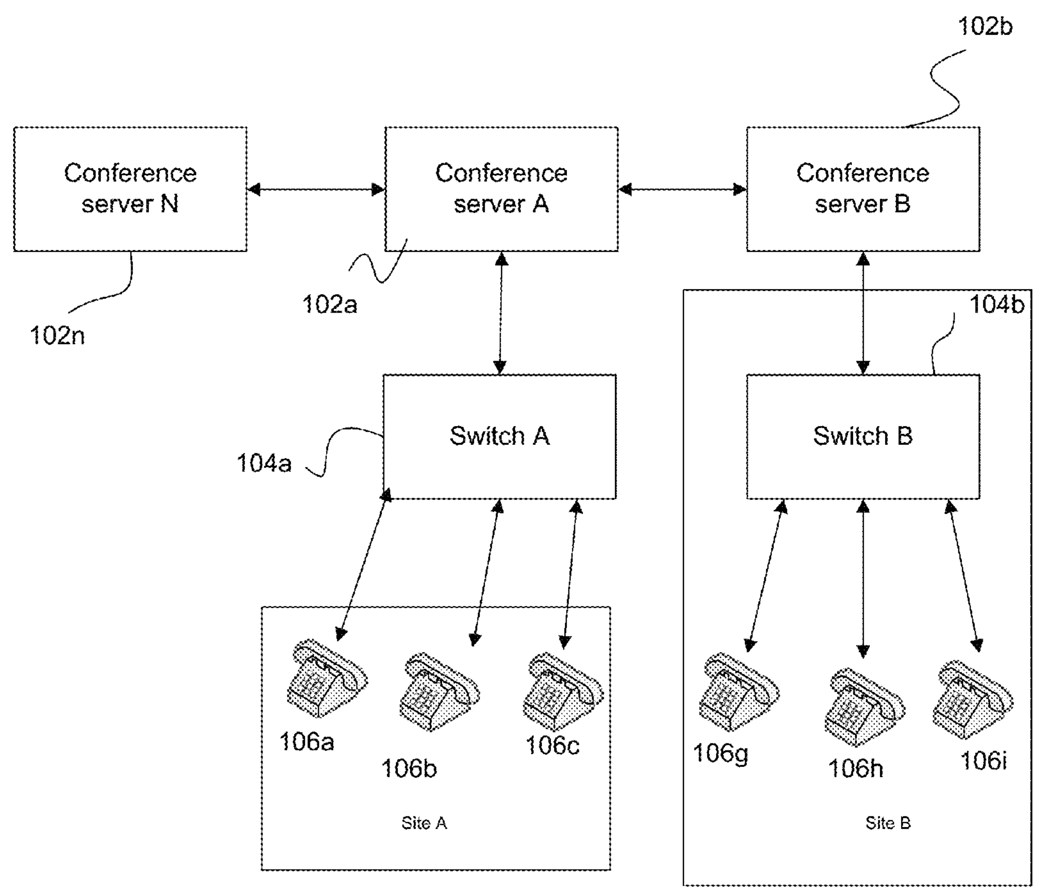
FIG. 1 is a block diagram of one embodiment of a distributed conferencing system according to the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A distributed audio conferencing architecture and method for optimum resource utilization and seamless scalability is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the telecommunication arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose computing systems including a processor, memory, non-volatile storage, input device and output device may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Distributed Conferencing System

Referring now to FIG. 1, telephones or endpoints 106*a-c* are present at client site A. Telephones 106*a-c* are communicatively coupled to switch A 104*a*. Switch A 104*a* may be an electronic switch, a digital switch, a soft switch or any other switch used to route phone calls. In one embodiment, switch A 104*a* is a conference server. The switch A 104*a* is communicatively coupled to conference server A 102*a*. The conference server A 102*a* is described in FIG. 2 below. At site B, telephones 106*g-i* are communicatively coupled to switch B 104*b*. Switch B 104*b* is communicatively coupled to conference server B 102*b*. As apparent from FIG. 1, telephones 106 may (as in Site A) or may not (as in Site B) be in the same site as switch A or B. The conference server N 102*n* is another conference server in the system 100. The conference server B 102*b*, conference server A 102*a* and conference server N 102*n* are communicatively coupled to each other. The distributed conferencing system of FIG. 1 also has other conventional VoIP system components (not shown) such as an MGCP gateway.

Figure 2:
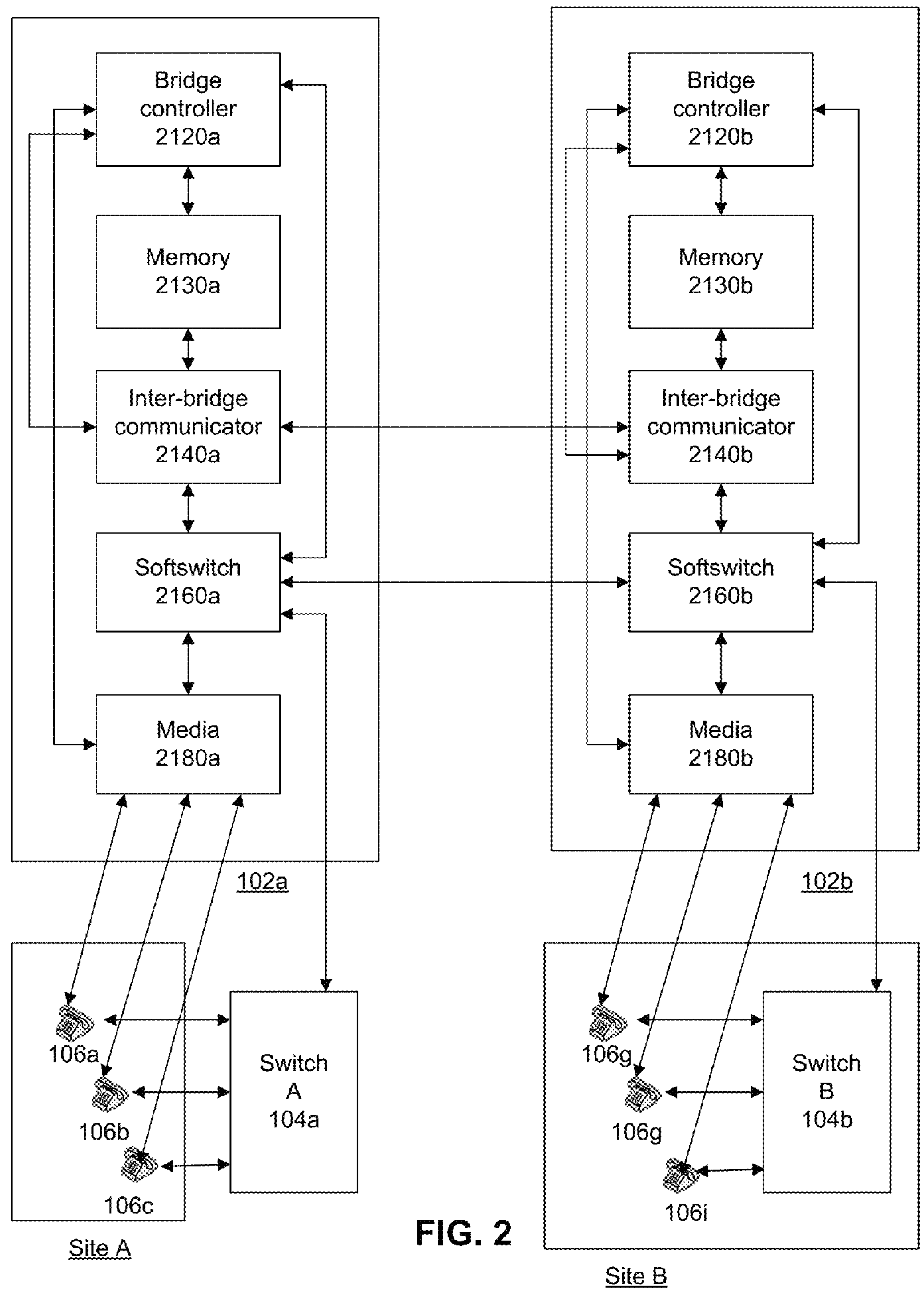
FIG. 2 is a block diagram depicting one embodiment of a distributed conferencing system in more detail according to the present invention.

FIG. 2 is a block diagram depicting one embodiment of a distributed conferencing system 100 in more detail. The conference server 102*a* and the modules in the conference server 102*a* in one embodiment are a computer with specialized software implementing the functionalities of a conference server 102*a* described below, and in a second embodiment are a custom made hardware implementation, or in a third embodiment are a combination of both custom made hardware and software implementation. Additionally, in one embodiment, a conference sever 102*a* can assume the role of a call manager, an assigned conference server, a conference bridge or a media mixer. Irrespective of the embodiment, the conference server 102*a* comprises a bridge controller 2120*a*, memory 2130*a*, an inter-bridge communicator 2140*a*, a softswitch 2160*a* and a media 2180*a*. Those of skill in the art will recognize that other embodiments of the conference server 102*a* can have different and/or other logical components than the ones described here, and that the functionalities can be distributed among the components in a different manner.

The bridge controller 2120*a* is the decision maker in the conference server 102*a*. The bridge controller 2120*a* manages memory 2130*a*, inter-bridge communicator 2140*a*, softswitch 2160*a* and media 2180*a*. The bridge controller 2120*a* instructs the above mentioned components to carry out their respective tasks at a given time. The bridge controller 2120*a* is communicatively coupled to memory 2130*a*, the inter-bridge communicator 2140*a*, the softswitch 2160*a* and the media 2180*a*. In one embodiment, the bridge controller 2120*a* is directly coupled to memory 2130*a* and the bridge controller 2120*a* communicates with inter-bridge communicator 2140*a*, softswitch 2160*a* and media 2180*a* indirectly through memory 2130*a*. The bridge controller 2120*a* is described in greater detail below in FIG. 14.

The memory 2130*a* is used to store various information required in operation of the conference server 102*a*. For example, the memory 2130*a* stores states of various conference sessions managed by the conference server 102*a*, the participants related to a particular conference session, information regarding other conference servers in the system etc. The memory 2130*a* comprises either or both volatile and non-volatile memory. Memory 2130*a* is communicatively coupled to bridge controller 2120*a*. In one embodiment, memory 2130*a* is also communicatively coupled to inter-bridge communicator 2140*a*, softswitch 2160*a* and media 2180*a*.

Inter-bridge communicator 2140*a* provides connectivity between various conference servers. A conference server 102*a* uses this connectivity to exchange media related data and call control data with other conference servers 102*n*. The inter-bridge communicator 2140*a* is communicatively coupled to bridge controller 2120*a*, memory 2130*a*, softswitch 2160*a* and inter-bridge communicator 2140*b* of conference server 102*b*. The inter-bridge communicator 2140*a* is also communicatively coupled to inter-bridge communicators of other conference servers (not shown) in a conference call system 100. The inter-bridge communicator 2140*a* communicates with other inter-bridge communicators through various protocols like Telephony Application Program Interface (TAPI).

Softswitch 2160*a* is responsible for resolving a dialed conference number to a conference session managed by conference server 102*a*. The softswitch 2160*a* is also responsible for setting up call connections with telephone 106*a-c* through switch A 104*a* and with conference server 102*b* through softswitch 2160*b*. The softswitch 2160*a* is communicatively coupled to media 2180*a*, switch A 104*a*, inter-bridge communicator 2140*a*, softswitch 2160*b* and bridge controller 2120*a*. The softswitch 2160*a* communicates with switch A 104*a* and softswitch 2160*b* to set up call connections through various signaling protocols like Session Initiation Protocol (SIP) and ShoreSIP.

The media 2180*a* encodes media data that is transmitted from the conference server 102*a* to other conference servers or telephones 106*a-c*. The media 2180*a* also decodes media data that is received by conference server 102*a* from telephones 106*a-c* and other conference servers. The media 2180*a* supports various codec standards like G.711, G.729, DVI4, G.722 etc. Media 2180 also encrypts, mixes and records media. Additionally, media 2180 plays media data back to telephones 106*a-c*.

Site A is a client site with telephones 106*a-c*. The client site A may represent a physical or a logical site comprising telephone 106*a-c*. The telephones 106*a-c* are communicatively coupled to switch A 104*a*. In one embodiment, telephones 106*a-c* are located within the same site as switch A 104*a*. In another embodiment, telephones 106*a-c* or some of these telephones are not located in the same site as switch A. Switch A 104*a* is a telephony switch that routes telephone calls to other switches (not shown) and conference server 102*a*. Switch A 104*a* is any kind of telephone switch including an electronic switch, a digital switch or a soft switch. In one embodiment, switch A 104*a* is conference server 102*a*. Switch A 104*a* is communicatively coupled to softswitch 2160*a* and telephones 106*a-c*. Switch A 104*a* communicates with softswitch 2160*a* to set up call connections through protocols like SIP and ShoreSIP.

Figure 14:
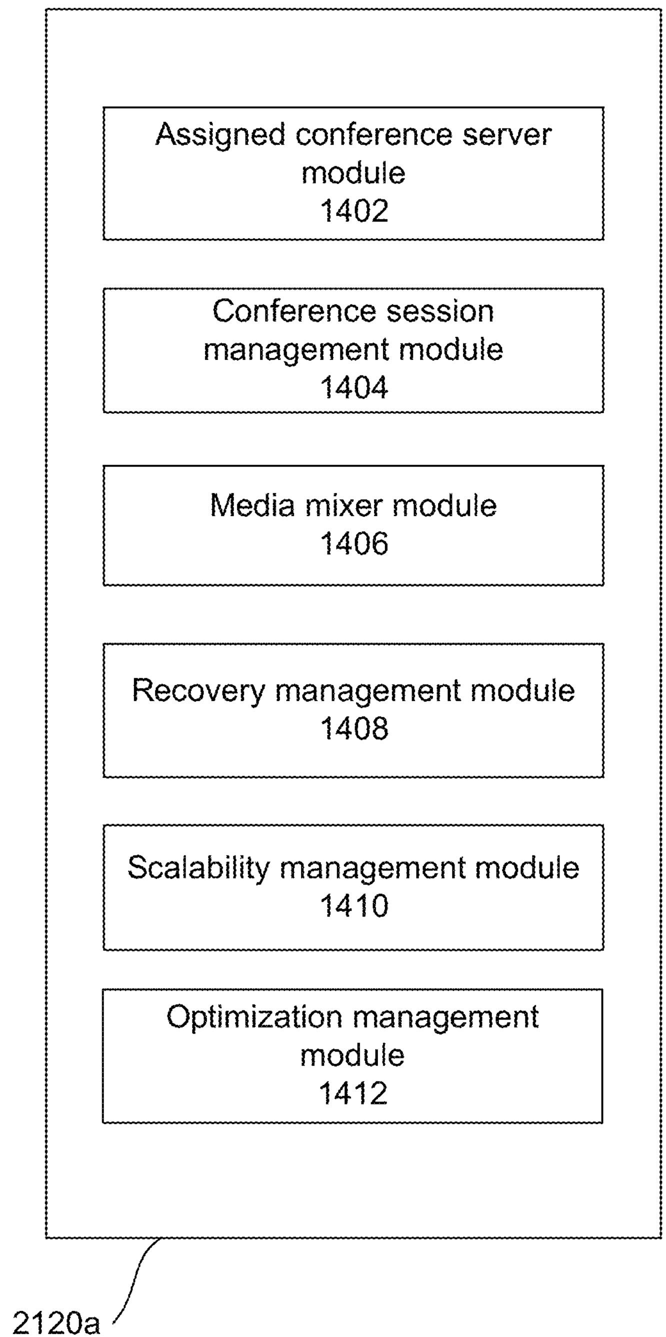
FIG. 14 is a block diagram depicting one embodiment of a bridge controller in more detail according to the present invention.

FIG. 14 is a block diagram depicting one embodiment of bridge controller 2120*a* in more detail. The modules in the bridge controller 2120*a* in one embodiment are a computer with specialized software implementing the functionalities of the modules described below, and in a second embodiment are a custom made hardware implementation, or in a third embodiment are a combination of both custom made hardware and software implementation. The assigned conference server module 1402 implements the functionality of the assigned conference server when the conference server 102*a* assumes the role of assigned conference server. One of the responsibilities of the assigned conference server is selecting a conference bridge for a connection.

The conference session management module 1404 manages information regarding other conference servers in the system 100, conference bridges in the system 100, conference sessions managed by those conference bridges, participants in those conference session and media mixers for those sessions. The conference session management module 1404 also executes part of the functionality required to set up a conference call and functionality of a conference bridge when conference server 102*a* assumes the role of a conference bridge. Some of the responsibilities of a conference bridge comprise receiving media data from its participants and other conference bridges, mixing media data from its participants and other conference bridges, and transmitting the mixed participant media data to its participants, media mixers and other conference bridges.

The media mixer module 1406 implements the functionality of media mixer when conference server 102*a* assumes the role of a media mixer. One of the responsibilities of the media mixer is to mix media received from a plurality of conference bridges and transmit the mixed media to the conference bridges.

The recovery management module 1408 implements the functionality for conference bridge failover and media mixer failover. The scalability management module 1410 implements the functionality of a conference server 102*a* that allows the distributed conferencing system 100 to add more conference servers to the system 100. The optimization management module 1412 implements various optimizations like assigned conference server optimization, resource fragment optimization, media stream number optimization and media stream bandwidth optimization.

Figure 3:
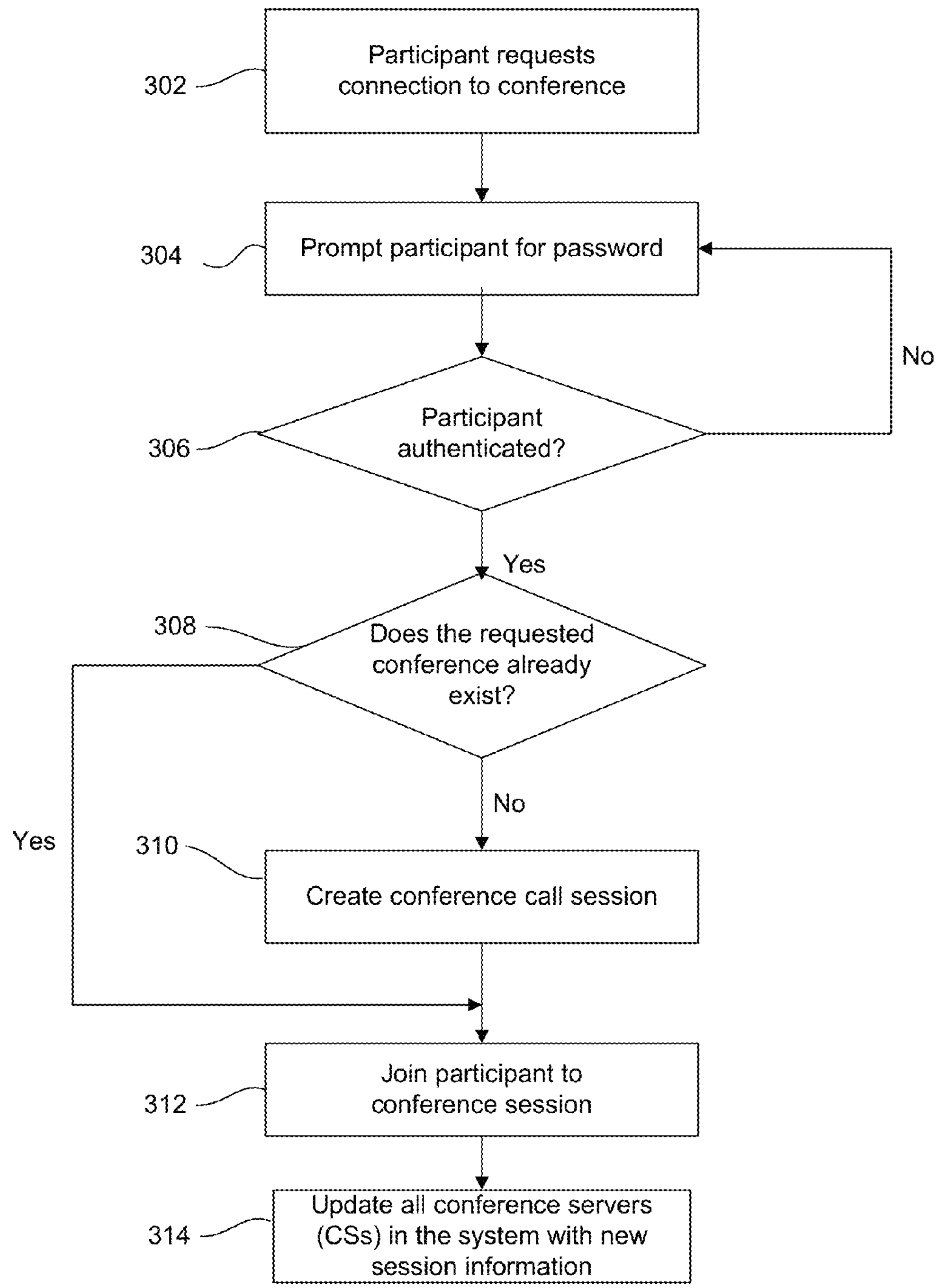
FIG. 3 is a flow chart depicting one embodiment of a method for setting up a conference call according to the present invention.

FIG. 3 depicts a method for setting up a conference call according to one embodiment of the present invention. To set up a conference call, the participant using telephone 106*a* dials a conference call number and requests 302 a conference call connection. The request is routed to switch A 104*a* which in turn routes the request to conference server 102*a*. The conference session management module 1404 in conference server 102*a* prompts 304 the participant to enter a password to join the conference call. This password has been configured in advance for the conference call session and the participants are given the password before they join the conference. In one embodiment, participants may be given different passwords depending on the priority level or the participant's need to attend the conference call. The participants that are necessary for the conference call may have a higher priority than participants that are optional. The conference session management module 1404 after receiving the password authenticates 306 the participant and stores the priority level for the participant's connection. The softswitch 2160*a* sets up the participant's connection and if the participant enters an invalid password, the conference session management module 1404 may again prompt 304 the participant for conference password.

The conference session management module 1404 in conference server 102*a* maintains information in memory 2130*a* regarding existing conference calls as discussed below. The conference session management module 1404 queries this information and determines 308 whether the requested conference call already exists. If the conference call does not exist, the conference server 102*a* creates 310 the conference call session. The conference session management module 1404 records the information about the new conference call session and the call set up for the conference call is managed by softswitch 2160*a*. If, however, the conference call already exits, the conference server 102*a* skips the step of creating a conference call session.

The conference session management module 1404 then joins 312 the participant to the conference call. After joining the participant to the conference call, the conference session management module 1404 updates 314 the other conference servers in the system 100 with updated information about the new participant, the conference session joined by the new participant, and the conference servers involved in managing the conference session. The conference session management modules of the other conference servers record this information and use this information to query for existing conference sessions when a participant requests a connection.

Figure 4:
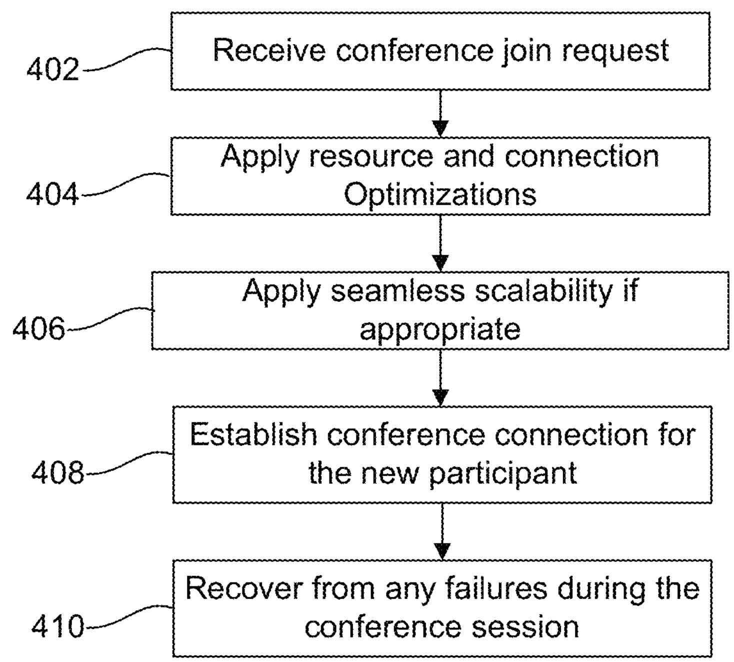
FIG. 4 is a flow chart depicting one embodiment of a method for establishing and operating a conference call according to the present invention.

FIG. 4 is a flow chart depicting one embodiment of a method for establishing and operating a conference call. For convenience, we refer to these features as being executed by the conference server 102*a*. A person of ordinary skill in the art would understand that these features can be implemented in other components without departing from the spirit of the invention. The conference server 102*a* first receives 402 a request from the participant using telephone 106*a* to join a conference. The optimization management module 1412 in bridge controller 2120*a* of conference server 102*a* then applies 404 resource and connection optimization techniques to efficiently use the available resources for servicing the connection request. The optimization techniques and methods are depicted in more detail in FIG. 5-9. The optimization management module 1412 also determines 406 whether the system 100 needs to scale or use an additional conference server 102*n* to service the connection request. This method is described in greater detail in FIG. 10. If additional conference server 102*n* is required to service the request, the conference server 102*a* enlists the help of conference server 102*n*. Next, the conference server 102*a* establishes 408 the requested connection for the new participant. In one embodiment, this new connection is established by the additional conference server 102*n* enlisted to scale resources for the conference session request. After establishing the connection, the conference server 102*a* tracks failure of any conference server in the system 100 and recovers 410 from such failures with minimal effect on the established conference connections. The recovery procedures are described in greater detail in FIG. 11-13.

Optimizations

Figure 5:
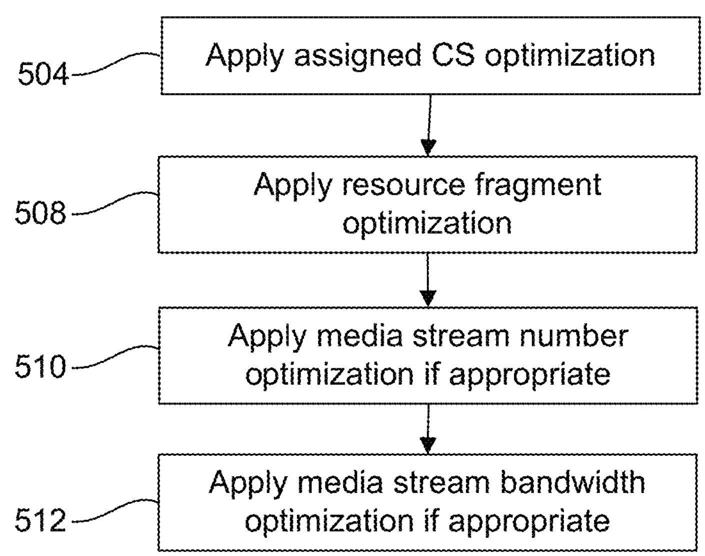
FIG. 5 is a flow chart depicting one embodiment of a method for optimizing a conference call according to the present invention.

FIG. 5 depicts a method for various optimizations used in setting up a conference call according to the present invention. The conference server 102*a* applies a number of optimizations before or during the conference call connection setup. The conference server 102*a* applies 504 assigned conference server optimization and applies 508 resource fragment optimization. The conference server also applies 510 media stream number optimization and applies 512 media stream bandwidth optimization if appropriate. These optimizations are described in greater detail in FIG. 6-9.

Figure 6:
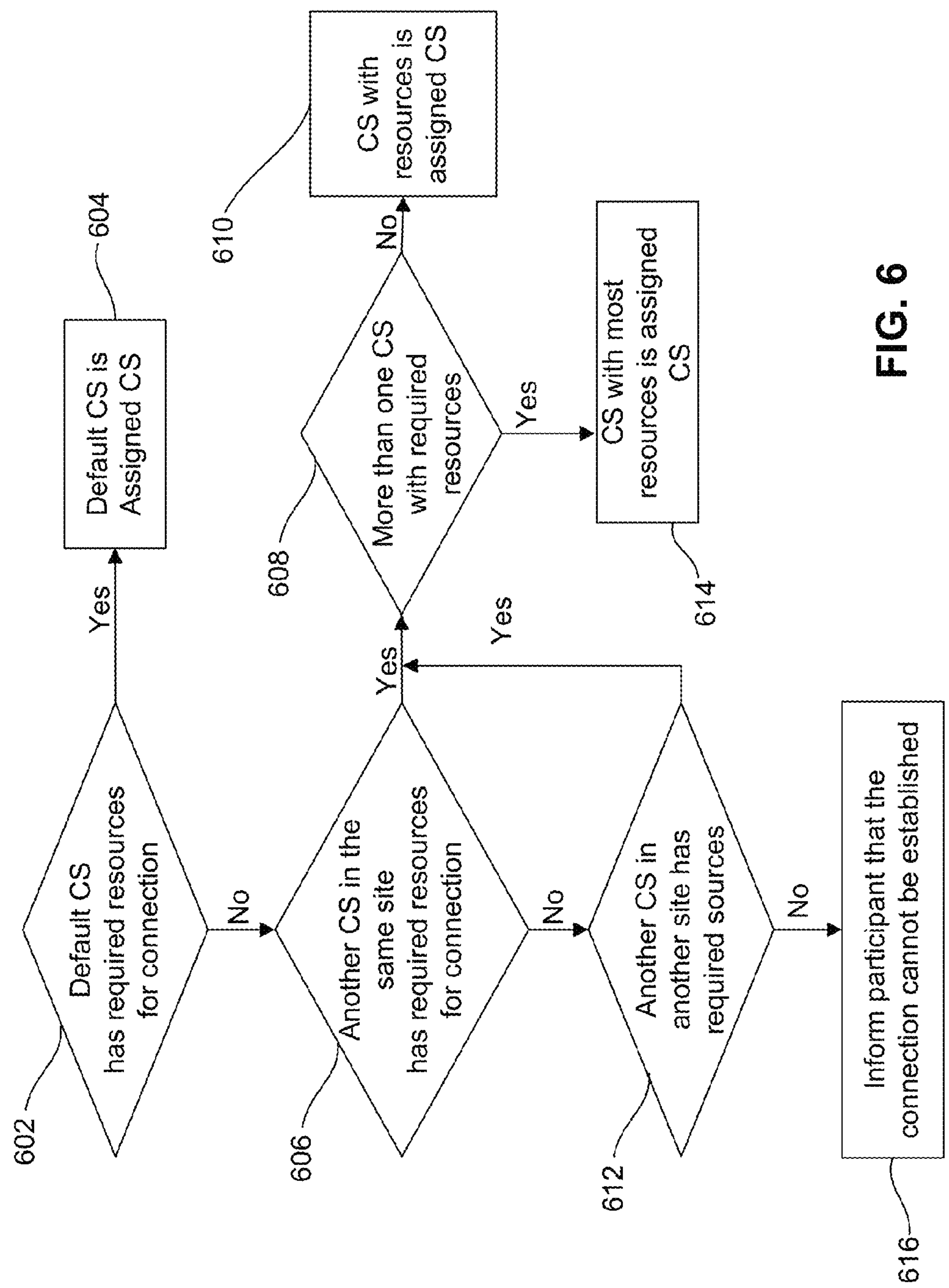
FIG. 6 is a flow chart depicting one embodiment of a method for selecting an optimum conference server as assigned conference server for a conference call connection according to the present invention.

FIG. 6 depicts a method for selecting an optimum conference server 102*a* as assigned conference server for a conference call connection. In one embodiment, switch A is pre-configured with an assigned conference server and switch A routes all the calls to the assigned server. In another embodiment, the method for selecting an assigned conference server can be implemented at switch A 104*a* in system 100. Alternatively, switch A 104*a* may be pre-configured to route conference call requests to a default conference server 102*a* and the default conference server 102*a* may implement the method depicted in FIG. 6. This default conference server 102*a* may be chosen because the chosen default conference server 102*a* has the most amount of bandwidth available to serve connections for switch A 104*a*. In one embodiment, switch A 104*a* is a conference server as well. In this embodiment, switch A 104*a* is itself the default conference server 102*a*. In other embodiments, the criteria for selecting a default conference server may differ according to the needs of a particular site.

In one embodiment, the method for electing an optimum assigned conference server is implemented partly in switch 104*a* and partly in default conference server 102*a*. In another embodiment, the method may be implemented in a completely different entity that maintains information about the conference servers in the system 100. For illustration purposes, we assume this entity to be switch A 104*a* that is already configured with a default conference server 102*a*.

Switch A 104*a* first checks whether the default conference server 102*a* has adequate resources, i.e. adequate processing power and bandwidth, to perform resource fragment optimization. In one embodiment, the conference server 102*a* is pre-configured with benchmarks of resources required for assigned conference server optimization per connection request. In another embodiment, the assigned conference server module 1402 in conference server 102*a* dynamically calculates the required resources by analyzing the resources it utilized in optimizing previous connection requests. The assigned conference server module 1402 also tracks the processing power and bandwidth currently utilized by conference server 102*a* and the amount conference server 102*a* has left for future requests. In one embodiment, the conference session management module 1404 tracks additional information about the connections that a conference server manages as a conference bridge and the sessions for which the conference server acts as a media mixer. The conference session management module 1404 transmits this update information to other conference servers periodically. In one embodiment, the update messages are sent with a unique identifier, like IP address of the conference server, which uniquely identifies the sender conference server. Other conference servers in the system 100 store and use this unique identifier and update information for various purposes. In one embodiment, this update information serves as a heartbeat or an alive message that informs the other conference servers that the sender of a particular update message is functional and has not failed.

In this manner, conference server 102*a* has information about available resources on other conference servers in the system 100 and the amount of resources required by a conference server to select a conference bridge and route the call to the conference bridge. Switch A 104*a* queries the default conference server 102*a* about its availability.

The assigned conference server module 1402 in default conference server 102*a* compares the amount of resources required for a connection with the amount of resources left on default conference server 102*a*. The assigned conference server module 1402 determines if the default conference server 102*a* has adequate resources for the new conference call connection and informs switch A 104*a* about its available resources. In one embodiment, switch A 104*a* periodically receives this resource information from conference server 102*a* and switch A 104*a* analyzes this information to determine whether the default conference server 102*a* has adequate resources. In one embodiment, switch A 104*a* is a conference server itself and therefore has the information about other conference servers in the system 100. In this embodiment, switch A does not query a conference server 102 and uses its own collected information to determine the default server's availability.

If the default conference server 102*a* has adequate resources, the default conference server 120*a* becomes 604 the assigned conference server for the connection and the method is complete. If, however, the default conference server 102*a* does not have the required resources, switch A 104*a* determines 606 whether any other conference server in the same site as switch A 104*a* or default conference server 102*a* has the required resources. A site is a physical or logical collection of one or more sub-networks in system 100. A sub-network is a group of network devices in a network that are grouped together into smaller efficient groups. A person of ordinary skill in the art understands the advantages of a sub-network and how to divide a network into various sub-networks.

If another conference server in the same site has the required resources, switch A 104*a* determines 608 if more than one conference server in the site has the required resources. If so, switch A 104*a* assigns 614 the conference server with the most resources in the site as the assigned conference server. Switch A 104*a* determines the conference server with most resources by analyzing the information it periodically receives from the conference servers 102*a-n* in the system 100 or querying the conference servers 102*a-n* in the system 100 about their available resources. In one embodiment, the available resource is a weighted average of available processing power and bandwidth. In another embodiment, the available resource is a weighted average of available processing power, bandwidth, memory or other resources in a conference server 102*a*. In yet another embodiment, available resource is calculated using only some, and not all, of the above mentioned variables.

If only one conference server 102*a* has the required resources in the site, switch A assigns 610 that conference server 102*a* as the assigned conference server. If, however, no conference server in the site has the required resources (step 606), switch A determines 612 whether any conference server in another site has the required resources. Switch A then proceeds to step 608 to select the assigned conference server from another site of system 100. If, however, none of the conference servers in the system 100 have the required resources as determined in step 612, switch A informs 616 the participant using telephone 106_a_ that the participant's connection cannot be established because of lack of resources.

After determining the assigned conference server for a connection, switch A 104_a_ routes the connection request to the assigned conference server 102_a_. The assigned conference server 102_a_ then performs the resource fragment optimization depicted in FIG. 15 and in greater detail in FIGS. 7A and 7B. In one embodiment, the resource fragment optimization is performed without electing an optimum assigned conference server, and the resource fragment optimization is performed by switch A 104_a_ or any other entity with information about conference servers in the system 100. For illustration purposes, we assume that assigned conference server 102_a_ implements the resource fragment optimization.

Figure 15:
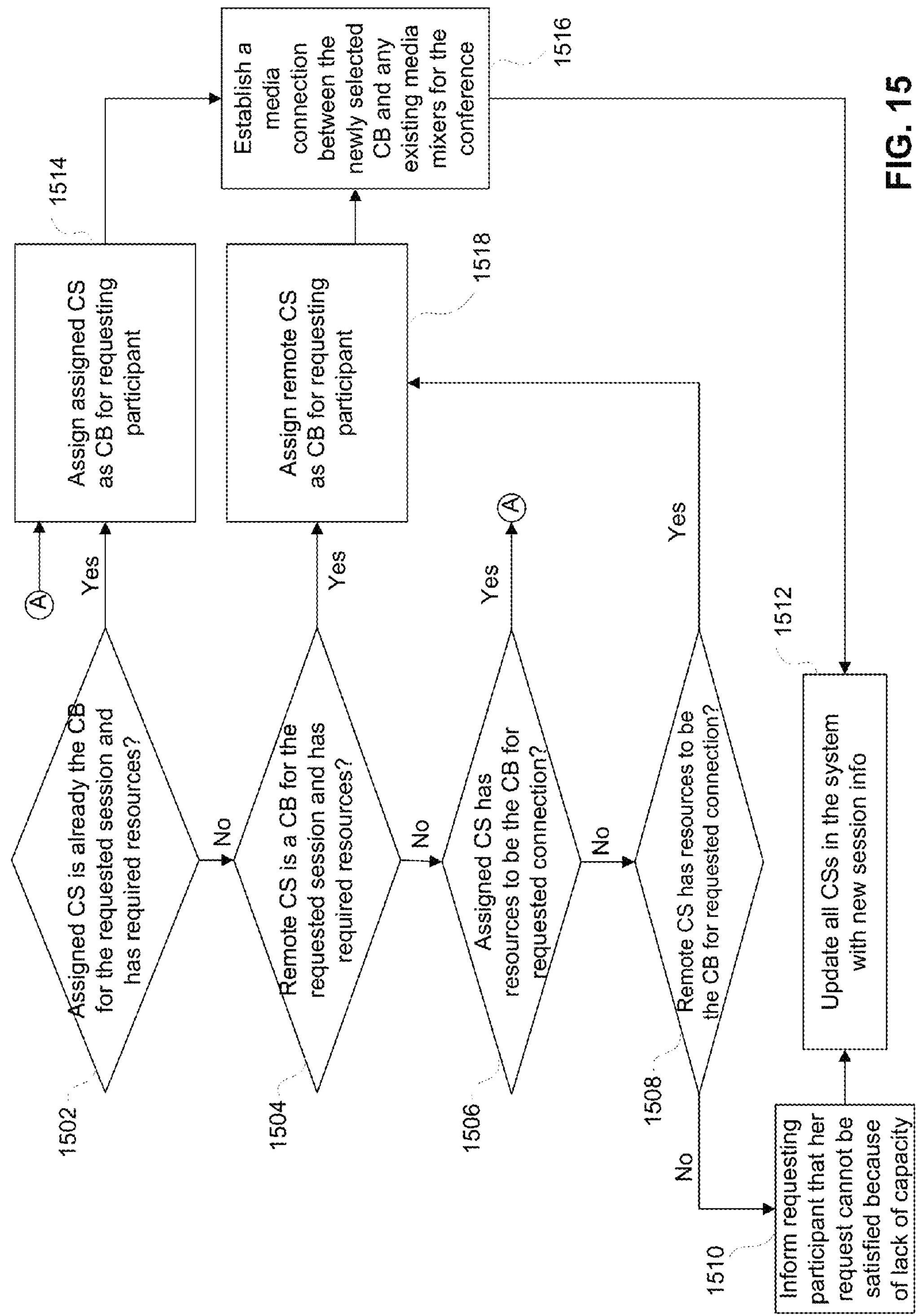
FIG. 15 is a flow chart depicting one embodiment of a method for optimizing resource fragmentation according to the present invention.

Referring to FIG. 15, the conference session management module 1404_a_ in assigned conference server 102_a_ tracks and stores information about the connections the assigned conference server 102_a_ manages as a conference bridge. The optimization management module 1412 analyzes this information to determine 1502 whether the assigned conference server 102_a_ is already a conference bridge for a second connection to the same conference call session. In one embodiment, the optimization management module also determines 1502 if the assigned conference server has the resources required to manage another connection to the conference call. If yes, the assigned conference server 102_a_ assigns 1514 itself as the conference bridge for the requested connection. The optimization management module 1412 then analyzes the update information previously sent by other conference servers and determines any existing media mixer for the conference call. The assigned conference server next establishes 1516 a media connection with the existing media mixer for the conference call. In one embodiment, the assigned conference server 102_a_ may modify or reuse without modifications the media connection with the media mixer the assigned conference server 102_a_ established for the second connection to the conference call. After establishing the connection with media mixer, the conference session management module 1404 in assigned conference server 102_a_ transmits update information to other conference servers in the system 100. The update information, among other things, informs the other conference servers about the new participant connection to the conference call, the conference bridge for the new participant connection, and the media mixer connected to the conference bridge for the conference call. In this manner, the assigned conference server 102_a_ assigns itself as the conference bridge for the new participant connection for the conference call if the assigned conference server 102_a_ is already a conference bridge for another connection to the conference call (as determined in step 1502).

If, however, the assigned conference server 102_a_ is not a conference bridge for another connection to the conference call (as determined in step 1502), the optimization management module 1412 in assigned conference server 102_a_ analyzes the update information previously sent by remote conference servers, i.e. conference servers other than the assigned conference servers, and determines 1504 if another conference server in the system 100 is a conference bridge for the conference call. In one embodiment, the optimization management module 1412 in assigned conference server 102_a_ also determines whether the conference bridge in system 100 has resources to manage another connection to the conference call.

In one embodiment, the optimization management module 1412 in assigned conference server 102_a_ searches for only those conference bridges that are in the same site as the assigned conference bridge 102_a_. If another or remote conference bridge is found, the optimization management module 1412 in assigned conference server 102_a_ assigns 1518 the other or the remote conference server as the conference bridge for the requesting participant. In one embodiment, the assignment is done by sending update information to conference servers in the system with information that the remote conference server is the new conference bridge for the connection. The remote conference server gets this information, and the remote conference server or the new conference bridge establishes 1516 connection with any existing media mixers for the connection and updates 1512 all other conference servers in the system 100 as discussed above.

When there is no other conference bridge managing a connection for the requested conference call (as determined in step 1504), the optimization management module 1412 determines 1506 if the assigned conference server has the resources to become the conference bridge for the requesting participant's connection. If yes, the assigned conference server becomes the conference bridge 1514 for the requesting connection, establishes a connection with existing media mixers for the connection, and updates all other conference servers in system 100 as discussed above.

If the assigned conference server 102_a_ does not have the resources to be the conference bridge, the optimization management module 1412 determines 1508 after analyzing the collected update information from other conference servers if another conference server in the system 100 has the resources to manage the requested connection. In one embodiment the check in step 1506 is skipped and the optimization management module in step 1508 determines the conference server that has the required resources to be the conference bridge. If another conference server has the required resources, the optimization management module 1412 assigns 1518 that conference server as the conference bridge for the requested connection. The new conference bridge then establishes 1516 connection with existing media mixers and updates 1512 other conference servers as discussed above.

When none of the conference servers in system 100 have the required resources (as determined in step 1508), the optimization management module 1412 informs 1510 the requesting participant that their connection cannot be established because of lack of resources. The conference session management module 1404 then updates 1512 all other conference servers in the system as discussed above.

Figure 7A:
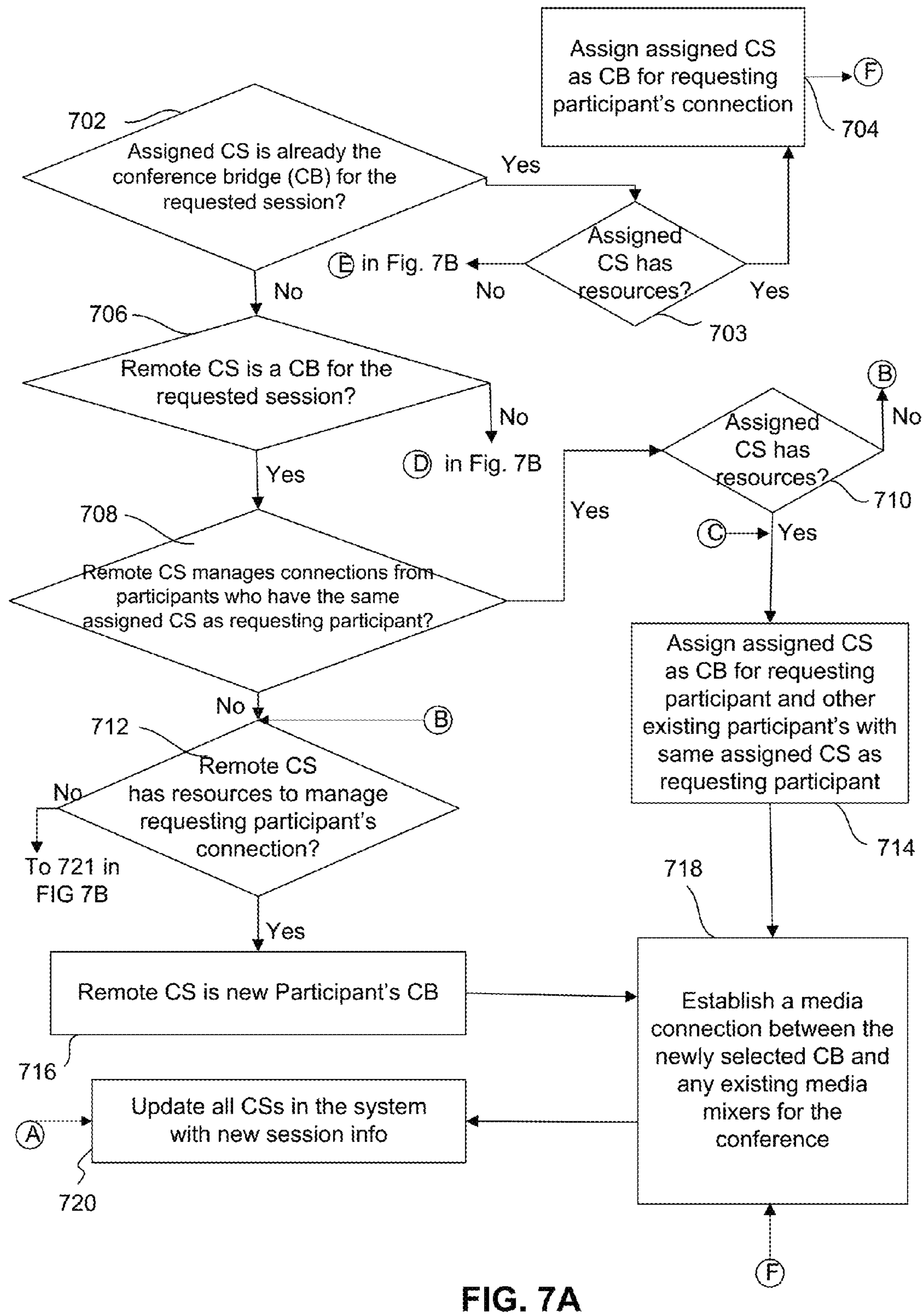
FIGS. 7A and 7B are a flow chart depicting in greater detail one embodiment of a method for optimizing resource fragmentation according to the present invention.
Figure 7B:
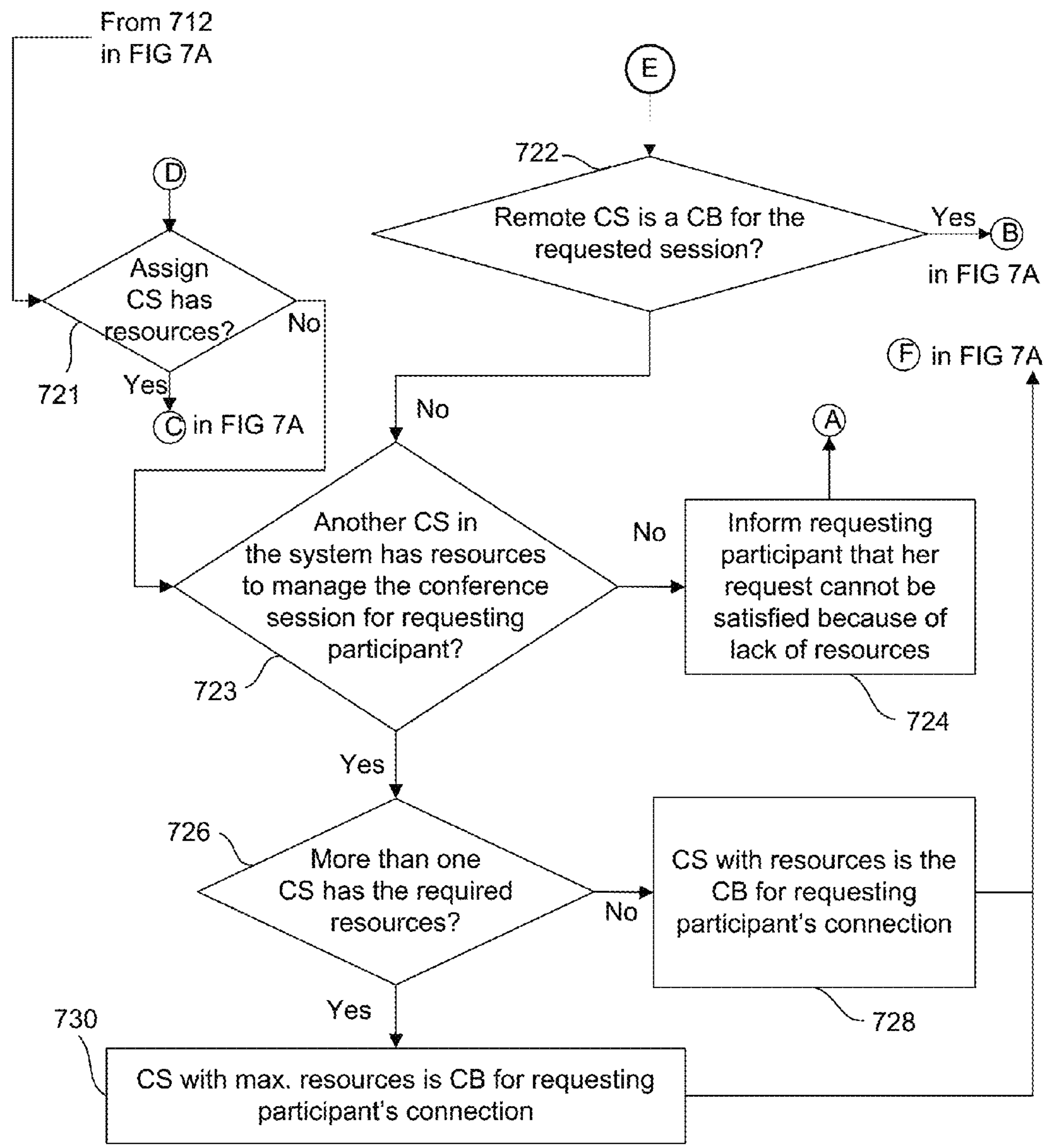

In this manner, the assigned conference server 102_a_ prevents fragmentation of resources by directing connection with the same assigned conference server to a common conference bridge. FIG. 15 therefore gives an overview of how the assigned conference server 102_a_ implements resource fragmentation optimization. FIG. 15, however, does not describe scenarios like how the assigned conference server 102_a_ selects a conference bridge if the assigned conference server 102_a_ is not a conference bridge for an existing connection but the assigned conference server 102_a_ does have resources to manage the requesting participant's connection. FIGS. 7A and 7B provide a more detailed description of the resource fragmentation optimization method described in FIG. 15.

Referring to FIGS. 7A and 7B, the optimization management module 1412 in assigned conference server 102_a_ determines 702 if another participant has already requested a connection to the conference call and whether the assigned conference server 102$a$ is already a conference bridge for that requested conference session. If the conference session is already managed by assigned conference server 102$a$, i.e. the assigned conference server 102$a$ is already a conference bridge for other connections to the conference session, the optimization management module 1412 determines 703 if the assigned conference server 102$a$ has resources to manage another connection for the same conference session. In one embodiment, the assigned conference server 102$a$ is pre-configured with benchmarks of resources required to manage a connection. In another embodiment, the optimization management module 1412 in assigned conference server 102$a$ dynamically calculates the required resources by analyzing the resources it utilized in managing a previous connection to a conference call. The conference session management module 1404 tracks the processing power and bandwidth currently utilized by assigned conference server 102$a$ and the amount assigned conference server 102$a$ has left for future requests. The optimization management module 1412 compares the amount of resources required for a connection with the amount of resources left on assigned conference server 102$a$ and the optimization management module 1412 determines if the assigned conference server 102$a$ has adequate resources to manage the new conference call connection.

If the assigned conference server 102$a$ has the required resources, the assigned conference server 102$a$ becomes 704 the conference bridge for the requested connection. The softswitch 2160$a$ and/or the inter-bridge communicator 2140$a$ in assigned conference server 102$a$ next establish 718 a media connection with any existing media mixers for the conference call session unless the assigned conference server already has an existing media connection with the media mixers for the conference session. The conference session management module 1404 then updates 720 other conference servers in the system with updated information about the session, session members, session media mixers, and the resource on the assigned conference server. The updated information also comprises information about the sessions managed by the conference server 102$a$, information regarding the participants in the session, the resources of conference server 102$a$ being used to manage a particular session, and the remaining resources of the conference server.

If the assigned conference server 102$a$ is managing the conference session (as determined in step 702), but the assigned conference server 102$a$ does not have the resources to manage additional connections for the session (as determined in step 703), the optimization management module 1412 determines 722 (See FIG. 7B) whether another conference server in the system is also managing the session. Every conference server in the system transmits information about its available resources and the sessions it manages. The conference servers in the system therefore have information about other conference servers in the system and the sessions managed by a particular conference server.

The optimization management module 1412 analyzes this information to determine 722 whether any other conference server is managing a conference session requested by the participant using telephone 106$a$. If no other conference server in the system is managing the conference session, the optimization management module 1412 inquires 723 whether other conference servers in the system have the resources to manage the additional conference session. If no conference server has the resources for managing the new conference session, the optimization management module 1412 in assigned conference server 102$a$ informs 724 the requesting participant that the requested conference session connection cannot be established because of lack of resources. The conference session management module 1404 then updates 720 other conference servers in the system with updated information about the session, session members, and the resource on the conference server 102$a$. The update information may include additional information as discussed above.

On the other hand, if more than one conference server has the resources to manage 726 the session, the optimization management module 1412 assigns the conference server with the most resources as the conference bridge for the participant's connection. If only one conference server has the required resources to manage the participant's conference connection (Step 723), that conference server becomes 728 the conference bridge for the connection.

The new conference bridge then establishes 718 (See FIG. 7A) a media connection with any existing media mixers for the conference session. This media connection is used to send and receive media data between the inter-bridge communicators of conference bridge and the media mixers. After establishing the media connection, the conference session management module 1404 in conference bridge 720 updates other conference servers in the system with new session information including information about the media mixers and any media connections existing between the conference bridge and the media mixers. The update information may include additional information as discussed above. This concludes the scenario where the requested conference session is already managed 702 by the assigned conference server 102$a$, the assigned conference server 102$a$ do not have 703 the resources to manage the additional connection for the new participant, and no other conference server in the system is managing 722 the conference session already for other participants.

If, however, another conference server in the system is managing the conference session, as determined in step 722, the optimization management module 1412 in assigned conference server 102$a$ determines 712 whether the managing conference server has the resources to manage another connection for the already managed session. The optimization management module 1412 uses the same process discussed above to determine whether the managing conference server has the required resources. If the managing conference server does not have the resources to manage an additional connection, the assigned conference server 102$a$ returns to step 721 and performs steps 723-730 discussed above to find another conference server in the system that has the resources to manage a conference call connection. The found conference server 102$a$ then establishes 718 a media connection with session's media mixers and updates 720 other conference servers in system 100 as discussed above.

On the other hand, when the managing conference server has the resources to manage an additional connection, as determined in step 712, the managing conference server becomes 716 the conference bridge for the requesting participant's connection. The softswitch 2160$a$ and/or the inter-bridge communicator 2140$a$ in the new conference bridge then establish 718 a media connection with any existing conference session media mixers. The new conference bridge next updates 720 other conference servers in the system with the updated information about the session, session members, session media mixers, session conference bridges, and the available resources on the new conference bridge. The update information may include additional information as discussed above. This concludes the scenario where the assigned conference server 102*a* is already managing the requested conference session as determined in step 702.

When the assigned conference server 102*a* is not already a conference bridge for the conference call session, the optimization management module 1412 in assigned conference server 102*a* determines 706 if a remote conference server, i.e. another conference server, is a conference bridge for the session In one embodiment, a remote conference server or remote conference bridge in description of FIGS. 7A and 7B is another conference server or conference bridge within the same site as the assigned conference server. In another embodiment, the remote conference server or remote conference bridge in description of FIGS. 7A and 7B is a conference server or conference bridge other than the assigned conference server in the system 100.

If a remote conference bridge does not exist for the session, the optimization management module 1412 determines 721 whether assigned conference server 102*a* has the resources to be the conference bridge for the participant's connection. If the assigned conference server 102*a* has the required resources, the optimization management module 1412 assigns 714 the assigned conference server 102*a* as the new conference bridge. The new conference bridge next establishes 718 a media connection with any existing media mixers for the conference call session. The assigned conference server 102*a* or the new conference bridge then updates 720 other conference servers in the system with the updated information about the session, session members, session media mixers, other session conference bridges, and the available resources on the new conference bridge. The update information may include additional information as discussed above. If the assigned conference server does not have the resources to manage the new connection (as determined in step 721), the assigned conference server goes through steps 721-730 described above to find a conference server with resources.

When another conference server, i.e. a remote conference server and not the assigned conference server 102*a*, is managing the requested conference session, the assigned conference server 102*a* determines 708 if the remote conference server is the conference bridge for other participants who have the same assigned conference server 102*a* as the requesting participant. If yes, the optimization management module 1412 in assigned conference server 102*a* determines 710 whether the assigned conference server 102*a* has the resources to manage the connections of new participant and existing participants with the same assigned conference server 102*a* as the new participant. If the assigned conference server 102*a* has the required resources, the assigned conference server 102*a* becomes the conference bridge for the connection of the new participant. The assigned conference server 102*a* then goes through steps 714, 716 and 718, as discussed above, to establish a media connection with session's media mixers and update other conference servers with update information.

If the optimization management module 1412 determines in step 710 that the assigned conference server 102*a* lacks the required resources, the optimization management module 1412 determines 712 whether the remote conference server has the resources to manage the requesting participant's connection. If yes, the remote conference bridge becomes 716 the conference bridge for the new participant's connection, establishes 718 media connections with any existing media mixers for the session, and updates 720 the conference servers in the system with updated information about the session, session members, session media mixers, session conference bridges, and available resources on the remote conference server. The update information may include additional information as discussed above.

If the optimization management module 1412 in assigned conference server 102*a* determines in step 710 that the assigned conference server 102*a* lacks the required resources, and the remote conference server does not have the resources for requesting participant's connection as determined in step 712, the assigned conference server goes through steps 721-730 described above to find a conference server with resources. The assigned conference server 102*a* then goes through steps 714, 716 and 718, as discussed above, to establish a media connection with session's media mixers and update other conference servers with update information. This concludes the scenario when remote conference server is managing connections of participants with the same assigned conference server 102*a* as the requesting participant (as determined in step 708).

When the remote conference server is not managing connections of participants with the same assigned conference server 102*a* as the requesting participant, but the remote conference server is managing other connections to the same conference session, the optimization management module 1412 in assigned conference server 102*a* determines 712 whether the remote conference server has the resources to become conference bridge for the requesting participant's connection. If the remote conference server does have the resources, the remote conference server becomes 716 the conference bridge for the requesting participant, establishes 718 media connections with any existing media mixers for the session, and updates 720 the conference servers in the system with updated information about the session, session members, session media mixers, session conference bridges, and available resources on the remote conference server. The update information may include additional information as discussed above.

If the remote conference server does not have the required resources, as determined in step 712, the assigned conference server 102*a* goes through steps 721-730 described above to find a conference server with resources. The selected conference server then goes through steps 714, 716 and 718, as discussed above, to establish a media connection with session's media mixers and update other conference servers with update information.

In this manner, one embodiment of the present invention selects fewer conference bridges for participants with the same assigned conference server 102*a*. The fewer conference bridges in turn leads to optimized use and lesser fragmentation of available resources.

The present invention also makes optimum use of available bandwidth by selecting media mixer 801*b* for a conference call. The conference bridges 801*a* and 801*c* mix media data from their respective participants and transmit the mixed data to the media mixer 801*b*. The media mixer 801*b* mixes the media data received from conference bridges 801*a* and 801*c*, and media mixer 801*b* transmits the mixed data stream back to the conference bridges. The media mixer 801*b* may be one of the conference bridges, another conference server, or a Switch or a PC specifically adapted to mix media data for conference calls.

Figure 8:
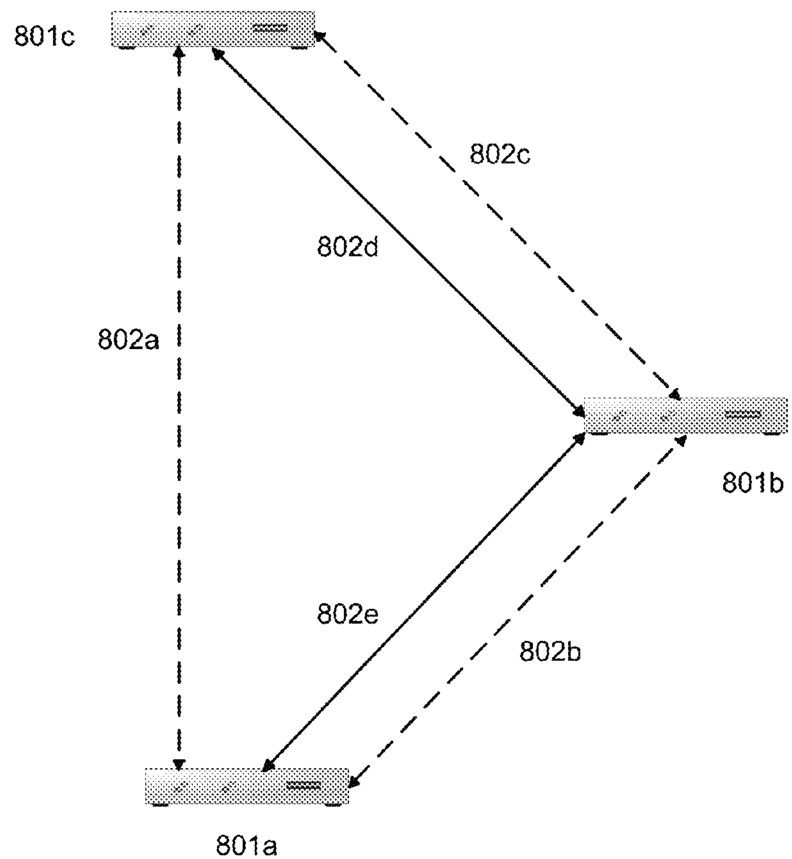
FIG. 8 is a block diagram depicting one embodiment of the distributed conferencing system with a media mixer according to the present invention.

FIG. 8 depicts two different ways of transmitting media in a conferencing system: one with a media mixer and one without a media mixer. The conferencing system in FIG. 8 includes three conference bridges 801*a*-*c*. When there is no media mixer in the conferencing system 800, the conference bridges mix the data received from their own participants and exchange their mixed participant media data with other conference bridges. The conference bridges 801*a* and 801*b* exchange their mixed participant media data on media connection 802*b*. Similarly, conference bridges 801*b* and 801*c* exchange their mixed participant media data on media connection 802*c*, and conference bridges 801*c* and 801*a* exchange their mixed participant media data on media connection 802*a*. Once the conference bridges 801*a-c* receives data from each other, the conference bridges 801*a-c* mix their mixed participant media data with mixed participant media data received from other conference bridges. The conference bridges then transmit the mixed data to their respective participants. The advantages of this embodiment are explained below in description of FIG. 16.

Figure 16:
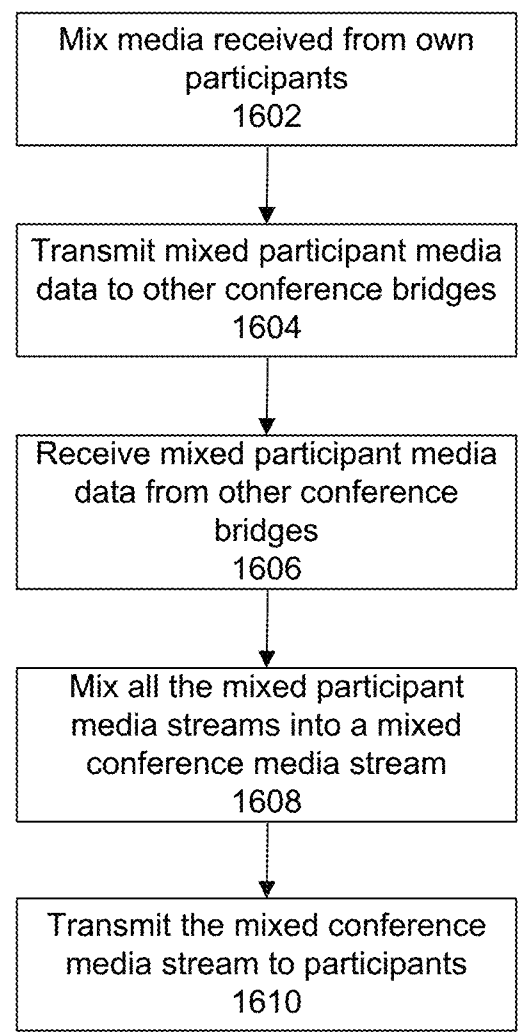
FIG. 16 is a flow chart depicting one embodiment of a method for mixing media from loudest parties in a conference call according to the present invention.

Referring to FIG. 16, in one embodiment, conference bridge 801*a* mixes 1602 media received from its own participants and transmits 1604 this mixed participant media to other conference bridges 801*b* and 801*c*. Conference bridges 801*b* and 801*c* also mix media data from their participants and transmit their mixed participant media to other conference bridges in the system. Conference bridge 801*a* receives 1606 the mixed participant media data from conference bridges 801*b* and 801*c*, and conference bridge 801*a* mixes 1608 its own mixed participant media with all the received mixed participant media data streams into a conference media stream. The conference bridge 801*a* then transmits the conference media stream to its own participants.

In this embodiment, each conference bridge 801 has a configurable number of loudest parties it can manage in a conference call. For example, conference bridges 801*a-c* may each be configured to manage three loudest parties in a conference call. The conference bridges in this example mix media data from three of their loudest participants. The mixed participant media stream is then transmitted to the other conference bridges. However, once a media stream is mixed, the media stream appears as one loudest party to conference bridges 801*a-c*. The conference bridges 801*a-c* therefore each have three mixed participant media stream: two mixed participant media streams from two other conference bridges and one mixed participant media stream for their own respective participants. The conference bridges 801*a-c* treat these three mixed media streams as the three loudest parties. Because conference bridges 801*a-c* are configured to mix media from three loudest parties, the conference bridges 801*a-c* are able to mix the three mixed participant media streams and transmit this mixed stream to their respective participants.

In this manner, the conference bridges 801 increase the number of loudest participants that can be heard in a conference call from n to $n^2$. Here, n is the number of loudest participants allowed per conference bridge. In this example, the conference bridges transmit mixed media to their participants and this mixed media can contain media from nine participants (three participants from each mixed participant media stream) and all nine participants can be heard in the conference call even if the nine participants are speaking in close temporal proximity.

In another embodiment in FIG. 8, when the system selects a media mixer 801*b*, the number of required media connections and number of mixing operations decrease. If conference bridge 801*b* is selected as a media mixer, conference bridges 801*a* and 801*c* establish media connections 802*e* and 802*d* with media mixer 801*b*. One skilled in the art will know that the media connections may also be established by media mixer 801*b* with conference bridges 801*a* and 801 *c*. The system therefore has two media connections instead of the three media connection required without a media mixer. Conference bridges 801*c* and 801*a* send their conference participants' media data to media mixer 801*b* on media connections 802*d* and 802*e*. In one embodiment, the conference bridges 801*a* and 801*c* mix the media from their respective participants and send the mixed participant media stream to media mixer 801*b*. In another embodiment, the conference bridges 801*a* and 801*b* send the unmixed media data from their participants to the media mixer 801*b*. Media mixer 801*b* then mixes its own participants' media data and the participants' media data from other conference servers. After mixing the data, the media mixer transmits the mixed data to conference bridges 801*c* and 801*a* on media connections 802*d* and 802*e*. The media mixer 801*b*, conference server 801*c* and conference server 801*a* then transmit the already mixed data to their respective participants.

As apparent, the media mixer 801*b* does not send its own participants' unmixed media data to any other conference server. This allows the system to save bandwidth that would have been used if the media mixer 801*b* had to transmit its own participants' unmixed data to other conference servers in the system.

In one embodiment, the media mixer 801*b* may send its media data to other conference servers. In another embodiment, the media mixer 801*b* does not have any conference call participants and therefore do not have any media data from its own participants. The media mixer 801*b* in that embodiment is mixing data for other conference servers.

In this manner, the selection of media mixer results in media stream bandwidth optimization. The conference bridges transmit their media data to media mixer instead of a plurality of conference bridge and the media mixer do not send its own media data to conference bridge. The media mixer sends the mixed media data to conference bridges and uses available system bandwidth efficiently and therefore performs media stream bandwidth optimization.

The selection of media mixer also results in media stream number optimization. When the system 100 employs a media mixer 801*b*, the conference servers 801*c* and 801*a* in one embodiment do not have to mix the media data from other conference bridges themselves. The conference servers receive already mixed data from media mixer 801*b* and therefore avoid spending processing power in receiving and then mixing media data from a plurality of conference bridges. In one embodiment, a conference server may mix additional data with received media data. In this manner, the selection of media mixer reduces the number of streams processed by conference bridges and results in media stream number optimization.

Figure 9A:
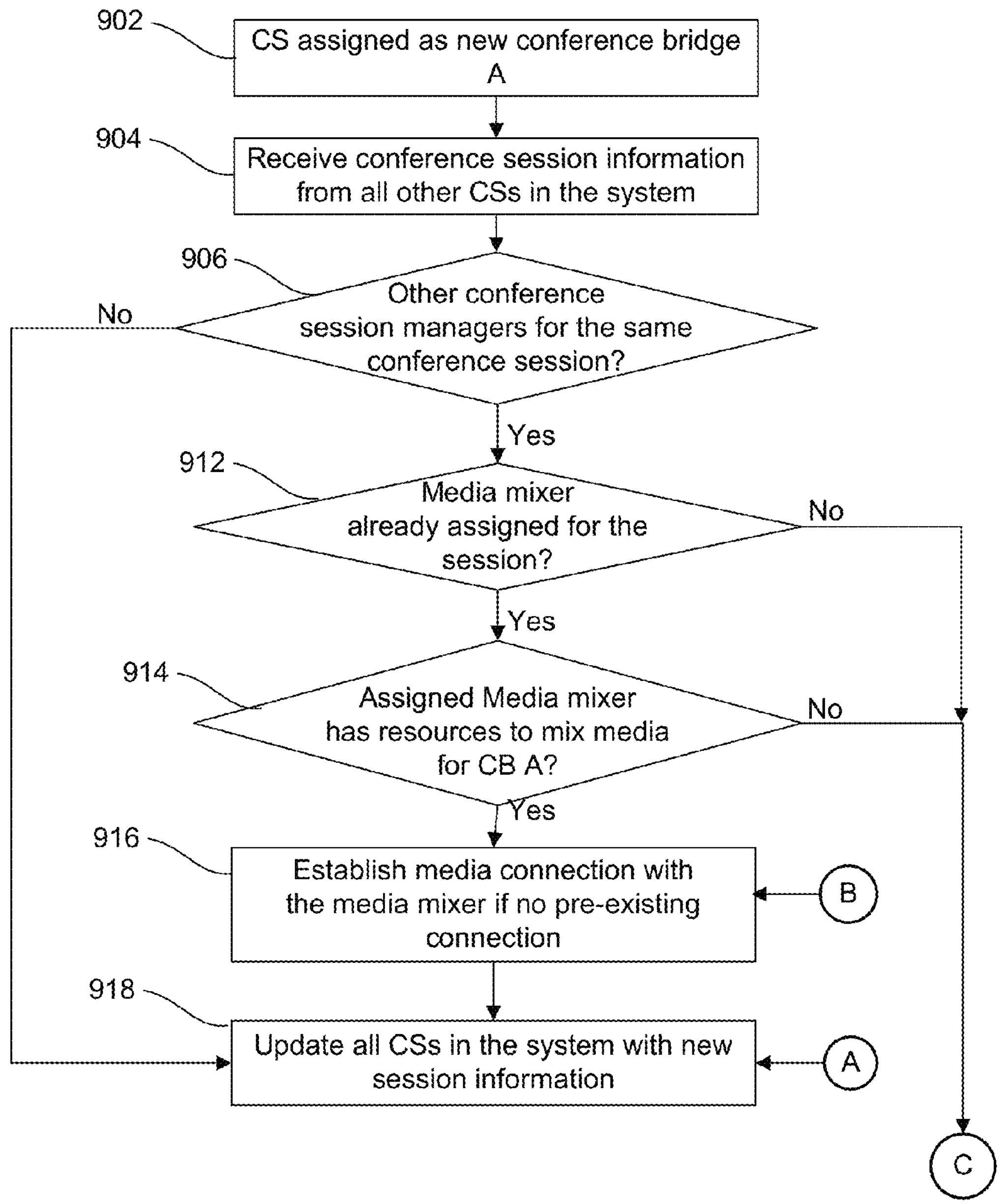
FIGS. 9A and 9B are a flow chart depicting one embodiment of a method for selecting a media mixer according to the present invention.
Figure 9B:
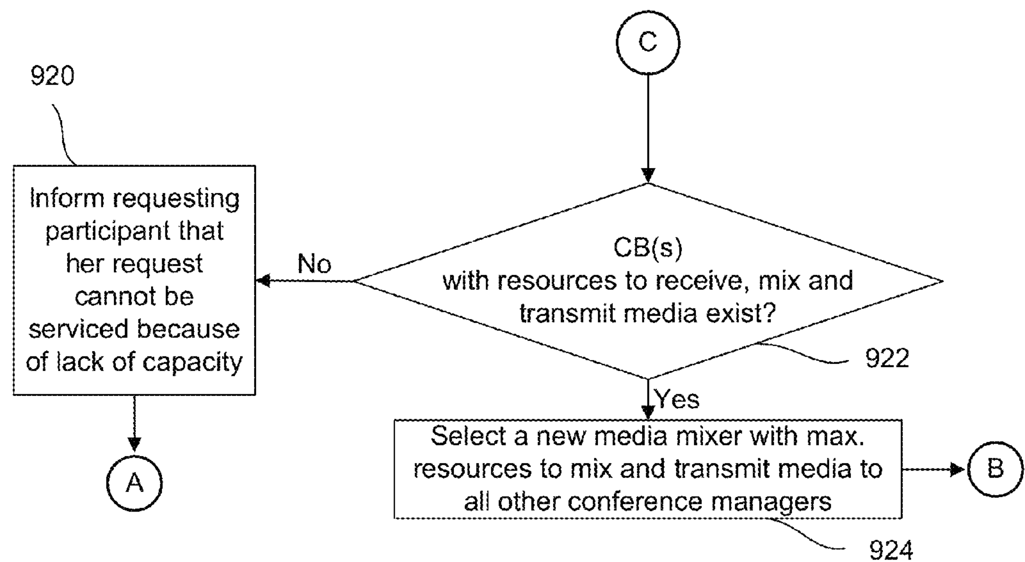

As explained above, any conference server can be selected as a media mixer. FIGS. 9A and 9B depict a method for selecting a media mixer. Once a participant's session is assigned to a conference server, the conference server becomes 902 the conference bridge for that participant. We will refer to this conference server as conference bridge A for illustration purposes. The conference bridge A receives 904 information from other conference servers in the system including information about the sessions for which the system's conference servers are conference bridges. The optimization management module 1412 in conference bridge A analyzes this information to determine 906 whether other conference bridges exists for the same conference session as the session conference bridge A is managing. If no other conference bridges exist for the session, the conference session management module 1404 in conference bridge A updates 918 other conference servers informing them that the conference bridge A is now the conference bridge for the new conference session for its participant. No media mixer is selected in this scenario as only one conference bridge exists for the conference session and therefore media data from other conference bridges does not need to be mixed. In one embodiment, the conference bridge A may select itself as the media mixer for the conference session at this time.

On the other hand, when another conference bridge exists for the conference session, the conference bridge A determines 912 if one or more media mixers already exist for the conference session. If no media mixer exists for the conference session as yet, the conference bridges search 922 for the conference bridge with the resources to receive, mix and transmit media. The optimization management module 1412 in conference bridges analyze the collected information about other conference bridges and conference servers. The optimization management module 1412 determine from their analysis if any conference bridge has the required resources. In one embodiment, the conference bridges are pre-configured with benchmarks of resources required to be a media mixer or mix media for n number of media streams. In another embodiment, the media mixers transmit to the conference servers in the system the resources used, i.e. the processing power usage and/or memory usage, by media mixers to mix n number of streams. This information is later used as benchmarks by the conference bridges.

If more than one conference bridge has the required resources, the conference bridges select 924 the conference bridge with the most amount of resources to be the media mixer. The conference bridges individually determine the potential conference bridges with the required resources, exchange information about these potential conference bridges, and select the conference bridge with the most amount of resources as the media mixer. Alternatively, one conference bridge selects the conference bridge with most amount of resources, selects that conference bridge as the media mixer, and informs the other conference bridges about the new media mixer.

Irrespective of who selects the media mixer, the softswitch and/or inter-bridge communicator in other conference bridges for the conference call then establish 916 a media connection with the media mixer. If none of the conference bridges have the required resources, the conference bridge A informs 920 its participant that the request to join the conference cannot be serviced because of lack of resources. In one embodiment, conference bridge A next searches for a conference server with the required resources that is not a conference bridge. If such a conference server exists, that conference server is selected as the media mixer. The conference servers in the system 100 then update 918 each other with the new conference session information including information about the new media mixer. The update information may include additional information as discussed above.

In case a media mixer 801*b* exists for the conference session, the conference bridge next inquires 914 whether the media mixer 801*b* has the resources to receive, mix and transmit media for the conference bridge A as well. If the existing media mixer does not have the resources, a new media mixer is selected as explained above. If, however, the media mixer has the resources, the conference bridge A establishes 916 a media connection with the media mixer unless a media connection already existed between the two entities. The conference servers in the system then update 918 each other with the new conference session information including information about the new media mixer. The update information may include additional information as discussed above.

Scalability and Failovers

Figure 10:
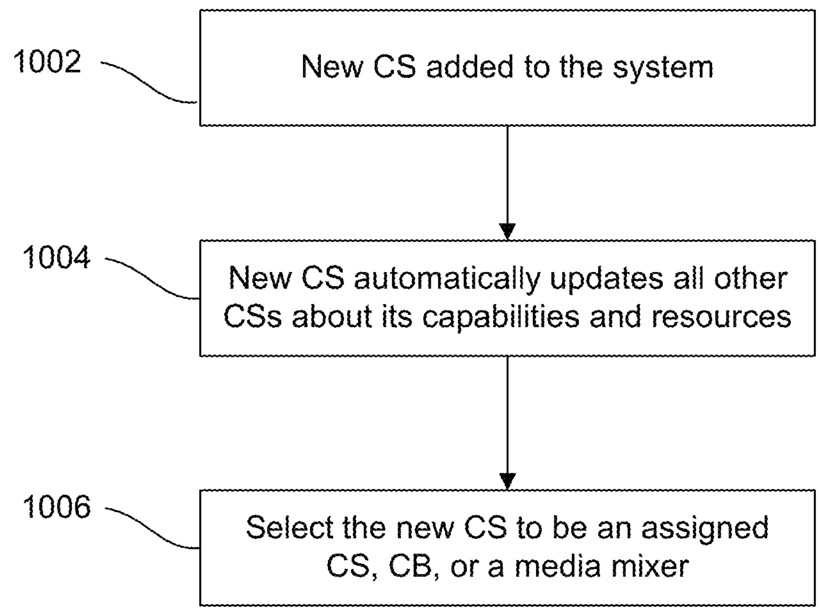
FIG. 10 is a flow chart depicting one embodiment of a method for seamlessly scaling the conference session according to the present invention.

FIG. 10 depicts a method for seamlessly scaling the resources of the distributed conferencing system. If an administrator of the distributed conference system 100 wants to add more resources to the conference call system, the administrator may add 1002 a new conference server to the conference system 100. Once the new conference server comes online, the scalability management module 1410 or the conference session management module 1404 in the new conference server updates 1004 other conference servers in the system with information about its capabilities and resources. The existing conference servers and switches in the system can now select 1006 the new conference server as an assigned conference server, a conference bridge, or a media mixer as explained in FIG. 6-9.

Figure 11:
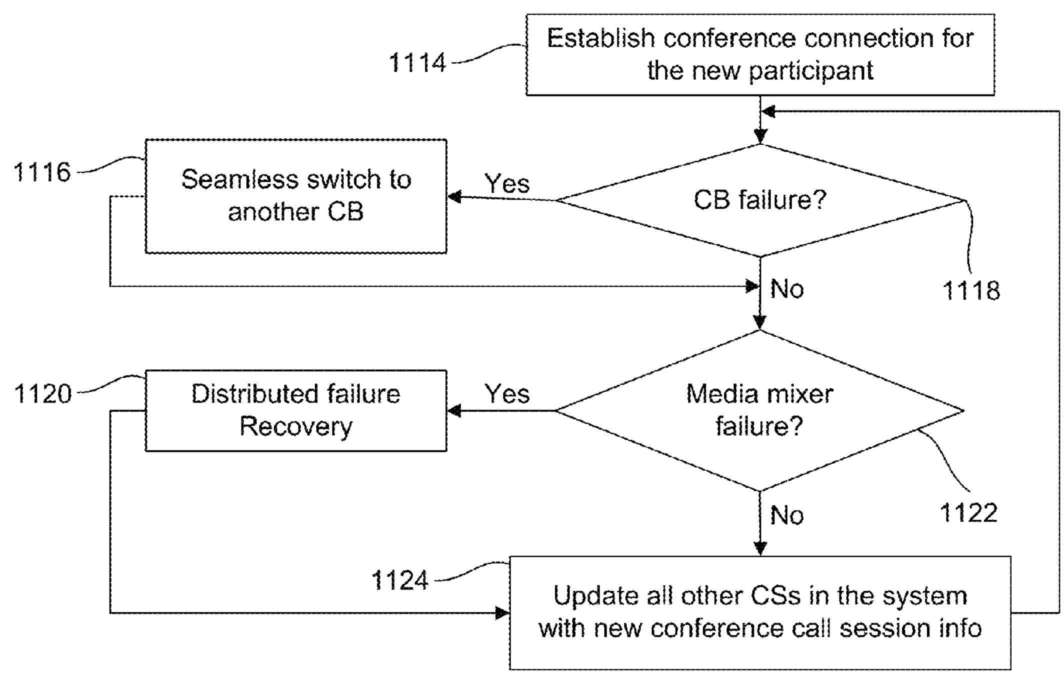
FIG. 11 is a flow chart depicting one embodiment of a method for a conference bridge failover or media mixer failover according to the present invention.

FIG. 11 depicts a method for conference bridge or media mixer failover. After a conference connection is established for a new participant, the participant's conference bridge or the media mixer 801*b* may fail during the conference call. In one embodiment, conference bridge and the media mixers are conference servers selected to be conference bridges or media mixers. The conference servers in the system 100 periodically transmit to switch A 104*a* and other conference servers information about their resources, their sessions, their participants and update information discussed above. If a conference server receiving this information does not get this information from another conference server sending this information for two or more consecutive period, the receiving conference server determines that the sending conference server has failed. In this manner, the conference servers, assigned conference servers or conference bridges determine the failed conference servers, assigned conference servers or conference bridges in the system.

If the conference bridge fails 1118 during the call, other conference bridges for the call or other conference servers in the system takeover 1116 failed conference bridge's calls. The conference bridge failover is described in FIG. 12 below. Similarly, if the media mixer for the conference call fails 1122 during the call, other conference bridges or conference servers assume 1120 the role of the failed media mixer and implement a distributed failure recovery. The media mixer failover is described in FIG. 13 below. After the recovery, the conference bridges, the media mixers and the conference servers update each other with updated information about the conference sessions, the new conference bridges or the new media mixers. The update information may include additional information as discussed above.

FIG. 12 depicts a conference bridge failover in more detail. For illustration purposes, we refer to switch A as implementing the failover procedure. One skilled in the art will know that the failover procedure may be implemented by another entity in the network without departing from the spirit of the invention. Referring back to FIG. 12, switch A 104*a* does not receive update information from a conference bridge for two or more consecutive periods and switch A 104*a* determines that the conference bridge has failed 1202. Switch A 104*a* next analyzes the update information from other conference servers and determines 1204 whether other conference bridges exist for the conference call. If no other conference bridges exist for the call, switch A 104*a* determines 1216 whether another conference server in the system has the available resources to become the conference bridge for failed conference bridge's participants. In one embodiment, the available resources are a weighted sum of one or more from the group of available processing power, available memory, number of free ports available for network communication, number of media streams coming in and going out of a conference server. In one embodiment the available resources also account for the codec being used by the conference server for compressing and decompressing participant media data. For example, different weighted values may be assigned to different codecs and these weighted values are added to one or more items from the above mentioned group to determine the available resources on a conference server.

If no conference server in the system has the available resources, switch A 104*a* informs 1220 the participants that their call cannot be continued because of lack of resources. If more than one conference server has the available resources, the conference server with the most resources becomes 1218 conference bridge for the failed conference bridge's participants. In one embodiment, the conference server with the least resource fragmentation and least bandwidth consumption becomes 1218 the conference bridge for the failed conference bridge's participants. The new conference bridge then updates 1214 other conference servers in the system with information about the conference sessions, session participants, session media mixers, session conference bridges, and the new conference bridge. The update information may include additional information as discussed above. Additionally, a message maybe sent to system administration informing the administration of the same. The above mentioned entities receive the update information, stop exchanging with the failed conference bridge media data for the participants of failed conference bridge, and instead exchange that media data with the new conference bridge. This concludes the scenario when other conference bridges do not exist for the session as determined in step 1204.

When other conference bridges exist in the system, switch A determines 1206 if the conference bridge with the most resources can service the failed conference bridge's participants. In one embodiment, switch A determines 1206 if the conference bridge with least fragmentation and least bandwidth consumption can service the failed conference bridge's participants. If the conference bridge has the required resources (alternatively least fragmentation and least bandwidth consumption), the conference bridge becomes 1210 the conference bridge for failed conference bridge's participants. In one embodiment, when more than one conference bridges have the required resources, the conference bridge that is in the same site as the failed conference bridge becomes the conference bridge for failed conference bridge's participants. In another embodiment, the conference bridge with most amount of resources among the plurality of eligible conference bridges becomes the conference bridge for the failed conference bridge's participants.

If none of the conference bridge have the required resources, switch A determines 1208 whether the existing conference bridges have the collective resources to service the failed conference bridge's participants. When the existing conference bridges do not have the required resources, switch A tries to find 1216 another conference server in the system to assume the role of conference bridge for the participants. This process has been explained above. On the other hand, if the conference bridges have the collective resources, switch A distributes 1212 the participants amongst the conference bridges according to the available resources on each conference bridge. The conference bridges then updates 1214 other conference servers in the system with information about the conference sessions, session participants, session media mixers, session conference bridges, and the new distribution. The update information may include additional information as discussed above.

Figure 13:
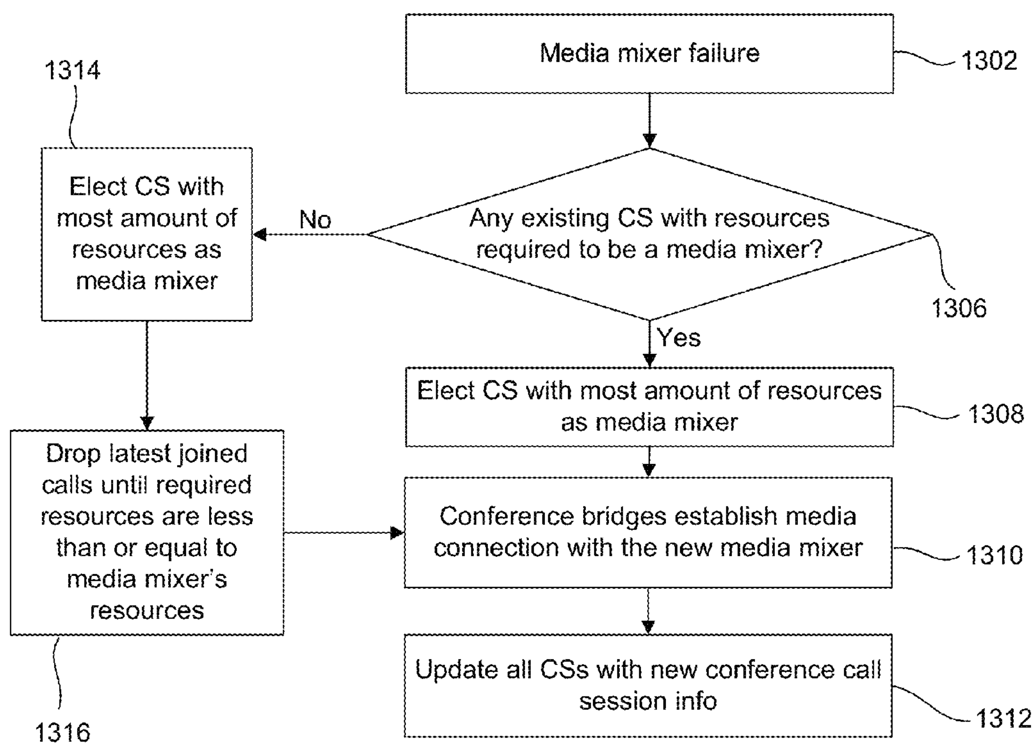
FIG. 13 is a flow chart depicting in detail a second embodiment of the method for a performing failover according to the present invention.

FIG. 13 depicts in detail the method for a media mixer failover. For illustration purposes, we refer to conference bridge as implementing the failover procedure. One skilled in the art will know that the failover procedure may be implemented by another entity in the network without departing from the spirit of the invention. Referring back to FIG. 13, one or more conference bridges do not get the update information discussed above from media mixer for two or more consecutive periods and the recovery management module 1408 in conference bridges determine that the media mixer has failed 1302.

In one embodiment, the conference bridges collectively choose a conference bridge to determine a new media mixer. In another embodiment, the conference bridges individually choose potential media mixers and collectively choose the new media mixers by choosing the media mixer with most resources amongst the potential media mixers. Irrespective of the entity that selects the new media mixer, the following steps describe the selection of media mixer.

The conference bridges next determine 1306 whether another conference server in the system has the required resources to become the media mixer. The conference server selected to be a media mixer is preferably an existing conference bridge. If more than one conference server has the required resources, the conference server with the most resources is selected 1308 as the media mixer. If no conference server in the system has the required resources, the conference server with the most resources is selected 1314 as the media mixer.

The media mixer module 1406 in the selected media mixer then instructs 1316 the conference bridges to drop the latest joined calls until the required resources are reduced to the amount of resources available at the media mixer. In one embodiment, the media mixer instructs the conference bridge to drop the participants with lower priority until the required resources are reduced to the amount of resources available at the media mixer. In another embodiment, the media mixer instructs the conference bridges to use a lower compression or higher compression codec to free up resources and therefore accommodate the existing participants.

In one embodiment, the conference bridges may select more than one conference server as media mixers so that none of the participants have to be dropped. The selected media mixers may mix media for different conference bridges, and then mix the mixed media streams from media mixers to make one unified mixed media stream. In another embodiment, the media mixers may share the work load in a different manner to create a mixed media stream for conference bridges. In any case, once one or more media mixer is selected, the conference bridges establish 1310 media connections with the media mixer. The conference bridges then update 1214 other conference servers in the system with information about the conference sessions and the new media mixer. The update information may include additional information as discussed above.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A conference server apparatus for facilitating a conference call, the apparatus comprising:

a bridge controller to direct other components in the apparatus, the bridge controller communicatively coupled to a memory and a soft switch;

the memory to store information for one or more components in the apparatus, the memory communicatively coupled to the bridge controller;

the soft switch to (i) resolve dialed conference numbers to conference sessions managed by the conference server, (ii) establish call connections with telephones connected to the conference server apparatus through an associated switch, and (iii) establish call connections with at least one other conference server through at least one other softswitch associated with the at least one other conference server; and a media component to encode media data transmitted from the conference server apparatus to one or more other conference servers and to mix media data from n loudest participants to create outgoing mixed participant media data, and wherein the apparatus is configured to receive incoming mixed participant media data from the one or more other conference servers, which includes media data from another set of loudest participants, and to mix the incoming mixed participant media data with the outgoing mixed participant media data to provide a conference media stream that includes media data from a number of loudest participants that is greater than n.

2. The apparatus of claim 1, wherein the bridge controller comprises a conference session management module that manages information about a plurality of conference servers.

3. The apparatus of claim 1, wherein the bridge controller comprises a media mixer module that mixes media received from a plurality of conference bridges.

4. The apparatus of claim 1, wherein the bridge controller comprises an optimization management module to implement at least one of media stream number optimization, media stream bandwidth optimization or resource fragment optimization.

5. The apparatus of claim 4, wherein the optimization management module implements the resource fragment optimization by negotiating with the at least one other conference server to determine whether to assign the conference server apparatus or the at least one other conference server as a conference bridge for a requesting participant's connection to the conference call, the bridge controller assigning the conference server apparatus or the at least one other conference server as the conference bridge for the requesting participant's connection to the conference call.

6. The apparatus of claim 4, wherein in response to assigning the conference server apparatus or the at least one other conference server as the conference bridge, the soft switch in the assigned conference server establishes a media connection with at least one media mixer for the conference call session.

7. The apparatus of claim 1, further comprising an inter-bridge communicator that provides data connectivity to exchange media related data and call control data between the apparatus and a plurality of other conference servers.

8. The apparatus of claim 1, wherein the apparatus is configured to mix the incoming mixed participant media data with the outgoing mixed participant media data, so as to mix n number of mixed participant media streams, each with n number of loudest participants, into a conference media stream with media data from $n^2$ loudest participants.

9. A system for setting up conference call, the system comprising:

a first conference bridge configured to transmit media data from a plurality of participants of the conference call to a media mixer, the first conference bridge comprising a bridge controller, a memory, and a soft switch; and the media mixer being configured to (i) prepare mixed media data from media data received from the first conference bridge and one or more other conference bridges and (ii) transmit the mixed media data to the first conference bridge, the media mixer comprising a bridge controller, a memory, a soft switch, and a media component the media component to encode and mix media data from n number of loudest participants to create outgoing mixed participant media data, to receive incoming mixed participant media data from the first conference bridge and the one or more other conference bridges which includes media data from another set of loudest participants, and to mix the incoming mixed participant media data with the outgoing mixed participant media data to provide a conference media stream that includes media data from a number of loudest participants that is greater than n.

10. The system of claim 9, further comprising an assigned conference server to route a connection from a conference call participant to the first conference bridge.

11. The system of claim 9, wherein the media mixer is a second conference bridge for a second participant of the conference call.

12. The system of claim 11, wherein the media mixer mixes media data from the second participant with the media data from the first conference bridge.

13. The system of claim 9, wherein the media mixer is configured to transmit, to the conference bridges, information about the resources used by the media mixer to prepare the mixed media data, including processing power usage and memory usage, and wherein at least one of the first conference bridge or the one or more other conference bridges is configured to use the information as benchmarks to determine whether it should be assigned as the conference bridge for a requesting participant's connection to the conference call, one of the first conference bridge or the one or more other conference bridges being assigned as the conference bridge based on the determination.

14. The system of claim 9, wherein the first conference bridge further comprises:

a conference session management module configured to track and store information about a plurality of connections managed by the first conference bridge; and an optimization management module configured to (i) analyze the connection information to determine whether the first conference bridge already manages a particular connection to the conference call, (ii) determine if the first conference bridge has the resources required to manage the particular connection to the conference call, and (iii) assign the conference bridge to manage the particular connection to the conference call based on the determinations.

15. The system of claim 14, wherein the optimization management module analyzes update information sent by other conference servers in the system and determines any existing media mixer for the conference call and the first conference bridge establishes a media connection with an existing media mixer for the conference call based on the determination.

16. The system of claim 9, wherein the media mixer is configured to mix media data streams from the first conference bridge and the one or more other conference bridges, each of said streams having already been mixed to include media data from n number of loudest participants, to create a conference media stream with media data from $n^2$ loudest participants, such that all $n^2$ loudest participants can be heard in the conference call even if the $n^2$ participants speak in close temporal proximity.

17. A system for setting up conference call, the system comprising:

(a) a first conference bridge configured to transmit to a second conference bridge a first mixed participant media stream including media data from a first group comprising at least a first loudest party; and (b) the second conference bridge configured to transmit to the first conference bridge a second mixed participant media stream including media data from a second group comprising at least a second loudest party wherein the first conference bridge and second conference bridge each comprise:

a bridge controller to direct other components in the respective conference bridge, the bridge controller communicatively coupled to a memory and a soft switch;

the memory to store information for one or more components in the respective conference bridge, the memory communicatively coupled to the bridge controller; and the soft switch to (i) resolve dialed conference numbers to conference sessions managed by the conference server, (ii) establish call connections with telephones connected to the respective conference bridge through an associated switch, and (iii) establish call connections with at least one other conference server through at least one other soft switch associated with the at least one other conference server.

18. The system of claim 17, wherein the first conference bridge mixes the first mixed participant media stream with the second mixed participant media stream into a conference media stream.

19. The system of claim 18, wherein the conference media stream includes media data from the at least first loudest party and the at least second loudest party.

20. The system of claim 18, wherein the first conference bridge transmits the conference media stream to the at least first loudest party.

21. The system of claim 17, wherein the first conference bridge is configured to mix media data from a first maximum number of loudest participants and the second conference bridge is configured to mix media data from a second maximum number of loudest participants.

22. The system of claim 17, wherein the first and second conference bridges are configured to negotiate to select either the first or second conference bridge to act as a conference bridge for all of the conference call connections to both conference bridges when the connection capacity of the selected bridge is equal or less than the connection load of both conference bridges.

23. The system of claim 17, wherein the first conference bridge and second conference bridge each further comprise a media component to encode media data transmitted from the respective conference bridge to the other conference bridge or to one or more other conference servers and to mix media data from n number of loudest participants to create outgoing mixed participant media data, and wherein the first conference bridge and second conference bridge are each configured to transmit the outgoing mixed participant media data with the other conference bridge or the one or more other conference servers, to receive incoming mixed participant media data from the other conference bridge or the one or more other conference servers, and, after receiving the incoming mixed participant media data from the other conference bridge or the one or more other conference servers, to mix the incoming mixed participant media data with the outgoing mixed participant media data, so as to mix n number of mixed participant media streams, each with n number of loudest participants, into a conference media stream with media data from $n^2$ loudest participants.

* * * * *